(12) United States Patent
Imagawa et al.

(10) Patent No.: US 12,703,546 B2
(45) Date of Patent: Aug. 11, 2026

(54) HOUSING

(71) Applicant: HI-LEX CORPORATION, Hyogo (JP)

(72) Inventors: Takuma Imagawa, Hyogo (JP); Shuhei Mieda, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 89 days.

(21) Appl. No.: 18/704,624

(22) PCT Filed: Nov. 4, 2022

(86) PCT No.: PCT/JP2022/041107

§ 371 (c)(1),
(2) Date: Sep. 16, 2024

(87) PCT Pub. No.: WO2023/080185

PCT Pub. Date: May 11, 2023

(65) Prior Publication Data

US 2025/0011050 A1 Jan. 9, 2025

(30) Foreign Application Priority Data

Nov. 4, 2021 (JP) ................................ 2021-180574

(51) Int. Cl.
*B65D 43/16* (2006.01)
*B60R 16/02* (2006.01)

(52) U.S. Cl.
CPC ........ *B65D 43/164* (2013.01); *B60R 16/0215* (2013.01)

(58) Field of Classification Search
CPC ... B65D 43/164; B60R 16/0215; B60R 16/02; E05D 3/02; F16C 1/10; F16C 11/04; H05K 5/03
See application file for complete search history.

(56) References Cited

U.S. PATENT DOCUMENTS

2016/0088934 A1 3/2016 Shiohara et al.
2022/0267056 A1* 8/2022 Morris ................ B65D 43/164

(Continued)

FOREIGN PATENT DOCUMENTS

JP H0345692 U 4/1991
JP H0415276 U 2/1992

(Continued)

OTHER PUBLICATIONS

International Search Report from corresponding PCT Application No. PCT/JP2022/041107, Jan. 17, 2023.

*Primary Examiner* — Shawn M Braden
(74) *Attorney, Agent, or Firm* — Workman Nydegger

(57) ABSTRACT

A housing can be provided, the housing comprising a housing body 2 and a lid 3, wherein the housing body 2 and the lid 3 have a shaft portion Ax1 and a bearing portion Ax2, wherein a side wall W2 has, in a base end region R2, an opposing surface F4 opposing an opposing surface F3 provided to the lid 3, wherein the opposing surface F3 and/or the opposing surface F4 has a projecting portion PR1, wherein the side wall W2 has an opposing surface F2 opposing an opposing surface F1 provided to the lid 3 in an axial direction X, and the opposing surface F1 and the opposing surface F2 are configured to be pressed against each other in the axial direction X at least in a state in which the lid 3 closes an aperture AP.

7 Claims, 10 Drawing Sheets

(56) References Cited

U.S. PATENT DOCUMENTS

| | | | | |
|---|---|---|---|---|
| 2024/0301913 | A1* | 9/2024 | Imagawa | F16C 1/22 |
| 2024/0401389 | A1* | 12/2024 | Boland | E05D 3/02 |

FOREIGN PATENT DOCUMENTS

| | | | |
|---|---|---|---|
| JP | H05343861 | A | 12/1993 |
| JP | H065286 | U | 1/1994 |
| JP | 2005059778 | A | 3/2005 |
| JP | 2016066722 | A | 4/2016 |
| JP | 2019183994 | A | 10/2019 |

* cited by examiner

HOUSING

TECHNICAL FIELD

The present invention relates to a housing.

BACKGROUND ART

For example, as shown in Patent Document 1, a cable coupling mechanism is used to couple a plurality of cables. The cable coupling mechanism is mounted to a predetermined position with respect to a mounting target such as a vehicle and the like, for example, and couples a plurality of cables at the predetermined position. A cable coupling mechanism as disclosed in Patent Document 1 has a housing comprising a housing body having an aperture on one side thereof and a lid to close an aperture provided in the housing body. The cable coupling mechanism further comprises a slider for coupling cables, the slider being slidably housed in the housing.

PRIOR ART DOCUMENT

Patent Document

Patent Document 1: JP 2019-183994 A

SUMMARY OF THE INVENTION

Problem to be Solved by the Invention

The above-mentioned lid of the housing is configured to rotate, in a hinge portion of the housing, around a predetermined rotational axis with respect to the housing body. The hinge portion of the housing may be structured to have a shaft portion, and a bearing portion to support the shaft portion to rotate around the rotational axis. A gap between the shaft portion and the bearing portion may be generated in a predetermined direction for various reasons such as dimensional errors in the molding of parts, a need to provide a predetermined clearance to facilitate assembly of the shaft portion and the bearing portion against each other, and the like. In this case, in a case that a mounting target such as a vehicle or the like vibrates or in a case that an operating target such as a cable or the like is operated, for example, the vibration is transmitted to the housing body or the lid. As a result of the vibration, the relative movement occurs between the shaft portion and the bearing portion. At this time, the shaft portion and the bearing portion make contact with each other, generating abnormal noise. Moreover, the housing body and the lid make repeated relative movements as the shaft portion and the bearing portion move relatively as a result of the vibration, causing the housing body and the lid to make contact with each other and generating abnormal noise.

Then, an object of the present invention is to provide a housing capable of suppressing the generation of abnormal noise when the housing comprising a housing body and a lid vibrates.

Means to Solve the Problem

A housing of the present invention comprises a housing body comprising a bottom wall, and a side wall erected from the bottom wall, wherein the housing body has an aperture opened to oppose the bottom wall; and a lid for closing the aperture, wherein the lid is connected to the side wall to rotate around a predetermined rotational axis, wherein one of the housing body and the lid has a shaft portion and the other one of the housing body and the lid has a bearing portion to support the shaft portion such that the lid rotates around the rotational axis, wherein the side wall has, in a base end region to be the rotational axis side, a second opening/closing direction opposing surface opposed in an opening/closing direction of the lid to a first opening/closing direction opposing surface provided to the lid in a state in which the lid closes the aperture, wherein the first opening/closing direction opposing surface and/or the second opening/closing direction opposing surface has a projecting portion projecting in the opening/closing direction from the first opening/closing direction opposing surface and/or the second opening/closing direction opposing surface, wherein an amount of projection of the projecting portion in the opening/closing direction is greater than a size of an opening/closing direction gap generated in the opening/closing direction between the shaft portion and the bearing portion, and the shaft portion is configured to be pressed against the bearing portion in the opening/closing direction by the projecting portion being pressed against the first opening/closing direction opposing surface and/or the second opening/closing direction opposing surface in the opening/closing direction in a state in which the lid closes the aperture and is held to the housing body, wherein the side wall has a second axial direction opposing surface opposed in an axial direction of the rotational axis to a first axial direction opposing surface provided to the lid in a state in which the lid closes the aperture of the housing body, and wherein the first axial direction opposing surface and the second axial direction opposing surface are configured to be pressed against each other in the axial direction at least in the state in which the lid closes the aperture.

Effects of the Invention

According to the housing of the present invention, it is possible to suppress the generation of abnormal noise when the housing comprising a housing body and a lid vibrates.

EMBODIMENT FOR CARRYING OUT THE INVENTION

Figure 1:
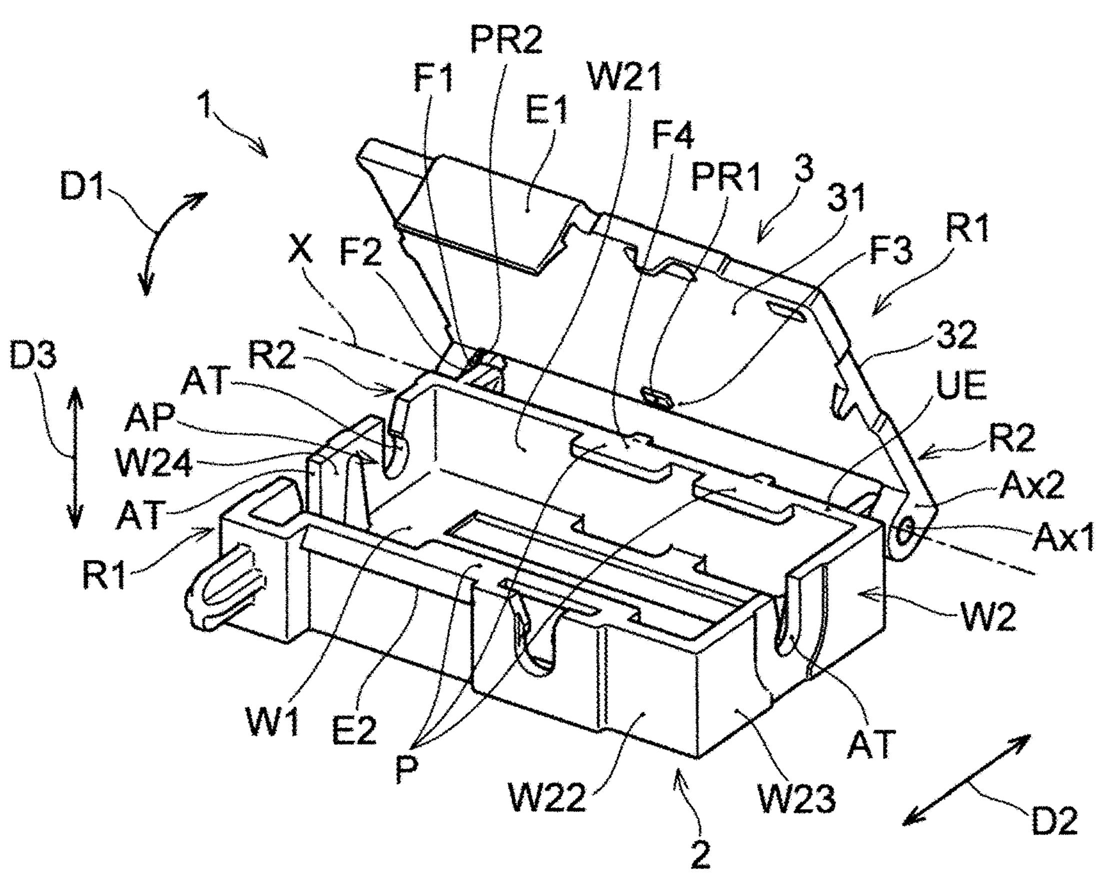
FIG. 1 is a perspective view of a housing of one embodiment of the present invention.

Below, with reference to the drawings, a housing of one embodiment of the present invention will be explained. Besides, the embodiment shown below is merely one example, so that the housing of the present invention is not limited to the embodiment below.

Besides, in the present specification, the expressions "perpendicular to A" and similar thereto refer not only to a direction completely perpendicular to A, but refer to include a direction substantially perpendicular to A. Moreover, in the present specification, the expressions "parallel to B" and similar thereto refer not only to a direction completely parallel to B, but refer to include a direction substantially parallel to B. Furthermore, in the present specification, the expressions "C shape" and similar thereto are refer not only to a complete C shape, but refer to include a shape that reminds of a C shape in appearance (a substantially C shape).

As shown in FIGS. 1 to 4, a housing 1 of the present embodiment comprises a housing body 2 comprising a bottom wall W1 (see FIG. 1), and a side wall W2 erected from the bottom wall W1 wherein the housing body 2 has an aperture AP opened to oppose the bottom wall W1, and a lid 3 for closing the aperture AP wherein the lid 3 is connected to the side wall W2 to rotate around a predetermined rotational axis X. Below, the rotational axis X is merely called the axis X and a direction in which the rotational axis X extends is called an axial direction X. Besides, in the present embodiment, the axial direction X is the same direction as the sliding direction of a slider S to be described below (see FIG. 6). Moreover, in the present embodiment, the axial direction X is also the same direction as a direction in which a cable C to be described below (see FIG. 6) extends in the housing 1. Furthermore, in the present embodiment, a direction in which the lid 3 opens/closes is called an opening/closing direction D1. In the closed state in which the lid 3 is closed (see FIG. 2), the opening/closing direction D1 is substantially the same direction as a far/near direction with respect to the bottom wall W1, and, in the present embodiment, is substantially perpendicular to the bottom wall W1. In the present embodiment, the opening/closing direction D1 can also be described as a direction in which a back surface 31 of the lid 3 and an upper end UE of the side wall W2 oppose in the closed state of the lid 3. Moreover, in the present specification, a direction perpendicular to the axis X in a plane parallel to the lid 3 in the close state or parallel to the bottom wall W1 is called a width direction D2 of the housing 1. The width direction D2 of the housing is also a direction connecting a base end portion side (a below-called base end region R2) to be the axis X side of the lid 3 with a tip end side (a below-called tip end region R1) of the lid 3 when the lid 3 is in the closed state. Furthermore, in the present specification, a direction perpendicular to both the axial direction X and the width direction D2 is called a height direction D3 of the housing 3. The height direction D3 of the housing 1 is also a direction perpendicular to the back surface 31 of the lid 3 when the lid 3 is in the closed state or perpendicular to an inner surface of the bottom wall W1, and is substantially the same direction as the opening/closing direction D1 in the closed state of the lid 3 in the present embodiment.

The application of the housing 1 is not particularly limited. In the present embodiment, as described below, the housing 1 makes it possible to suppress abnormal noise generated as a result of the vibration of the housing 1 and is suitably used under the environment in which the vibration occurs, in other words, as a housing to be attached to a mounting target having a vibration source such as a vehicle.

Figure 2:
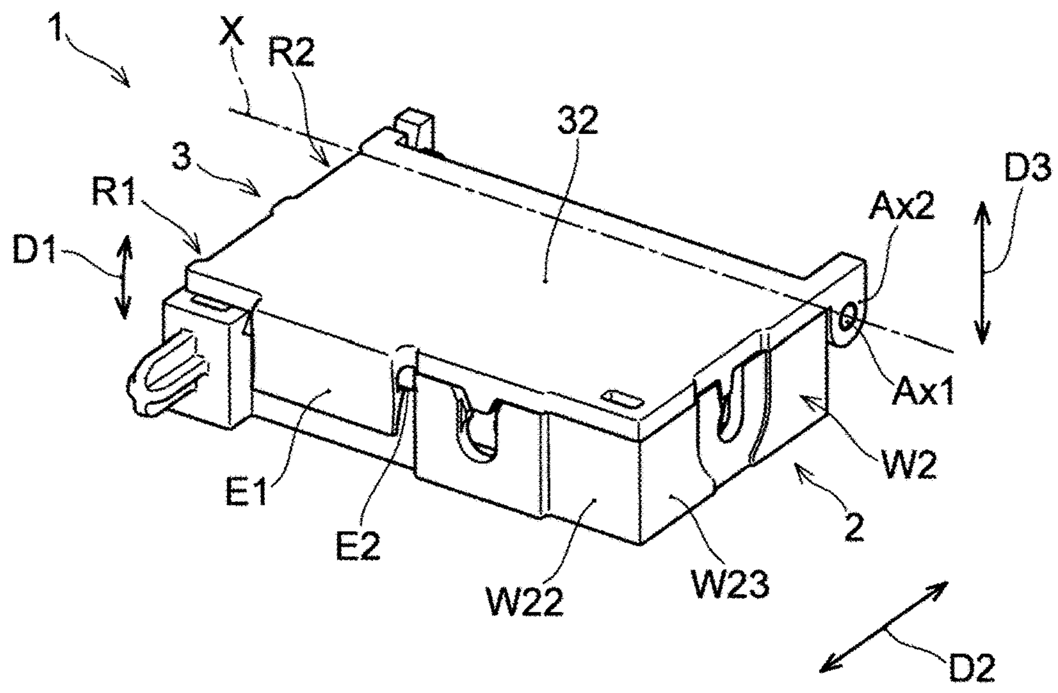
FIG. 2 is a perspective view showing a closed state in which a lid of the housing of FIG. 1 is closed.
Figure 3:
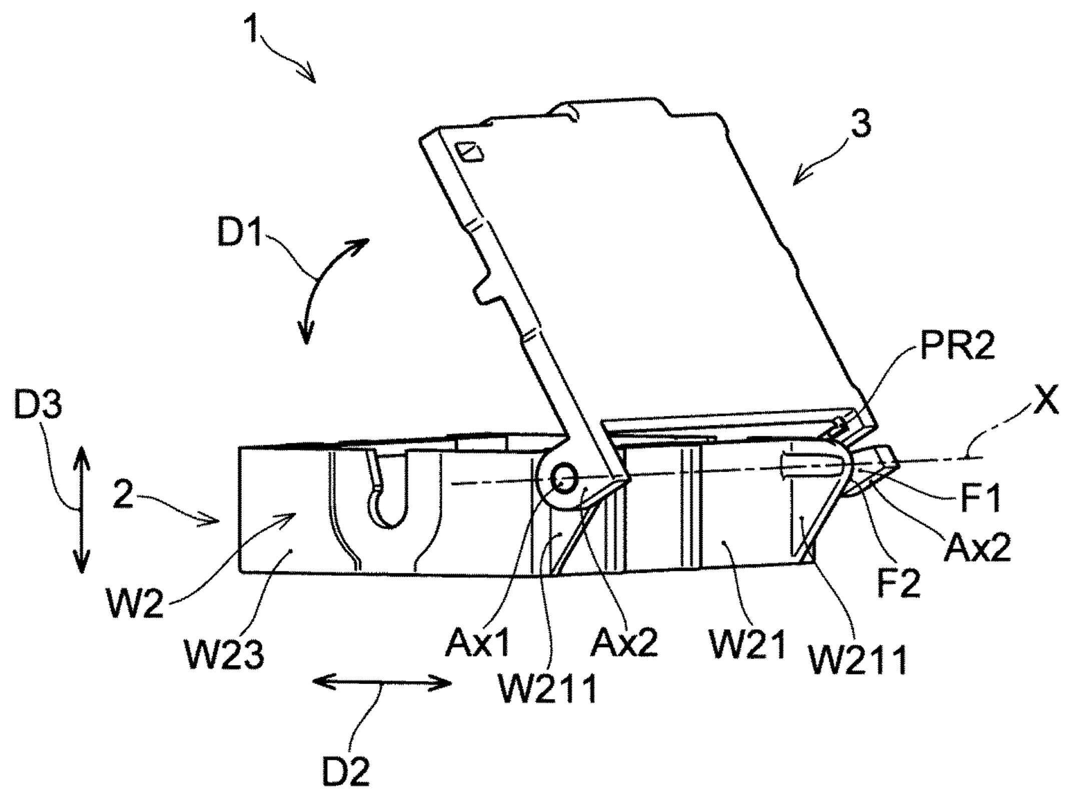
FIG. 3 is a perspective view in which the housing of FIG. 1 is viewed from another direction.
Figure 4:
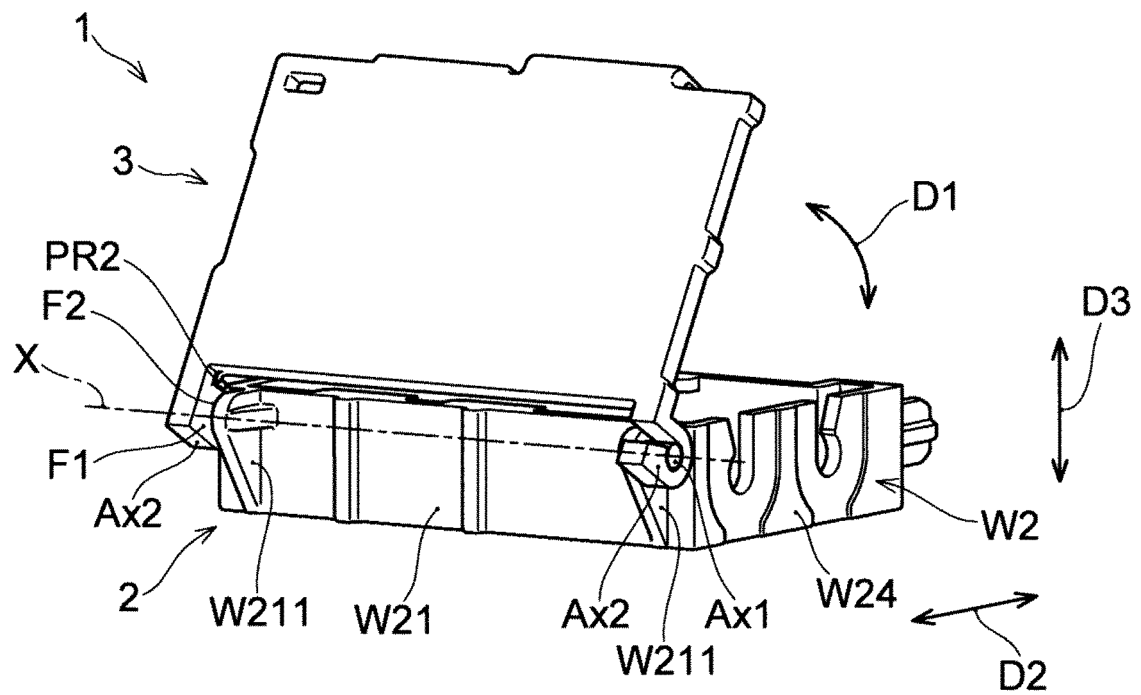
FIG. 4 is a perspective view in which the housing of FIG. 1 is viewed from yet another direction.
Figure 5:
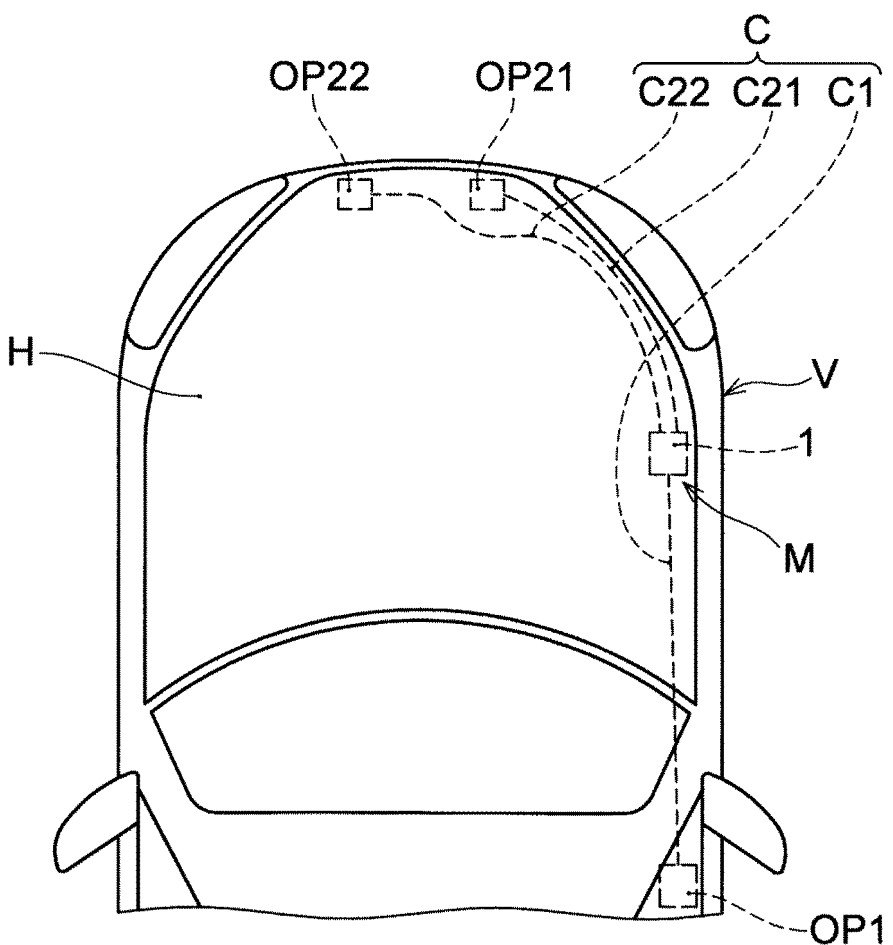
FIG. 5 is a schematic view showing a vehicle to which the housing of one embodiment of the present invention is provided.
Figure 6:
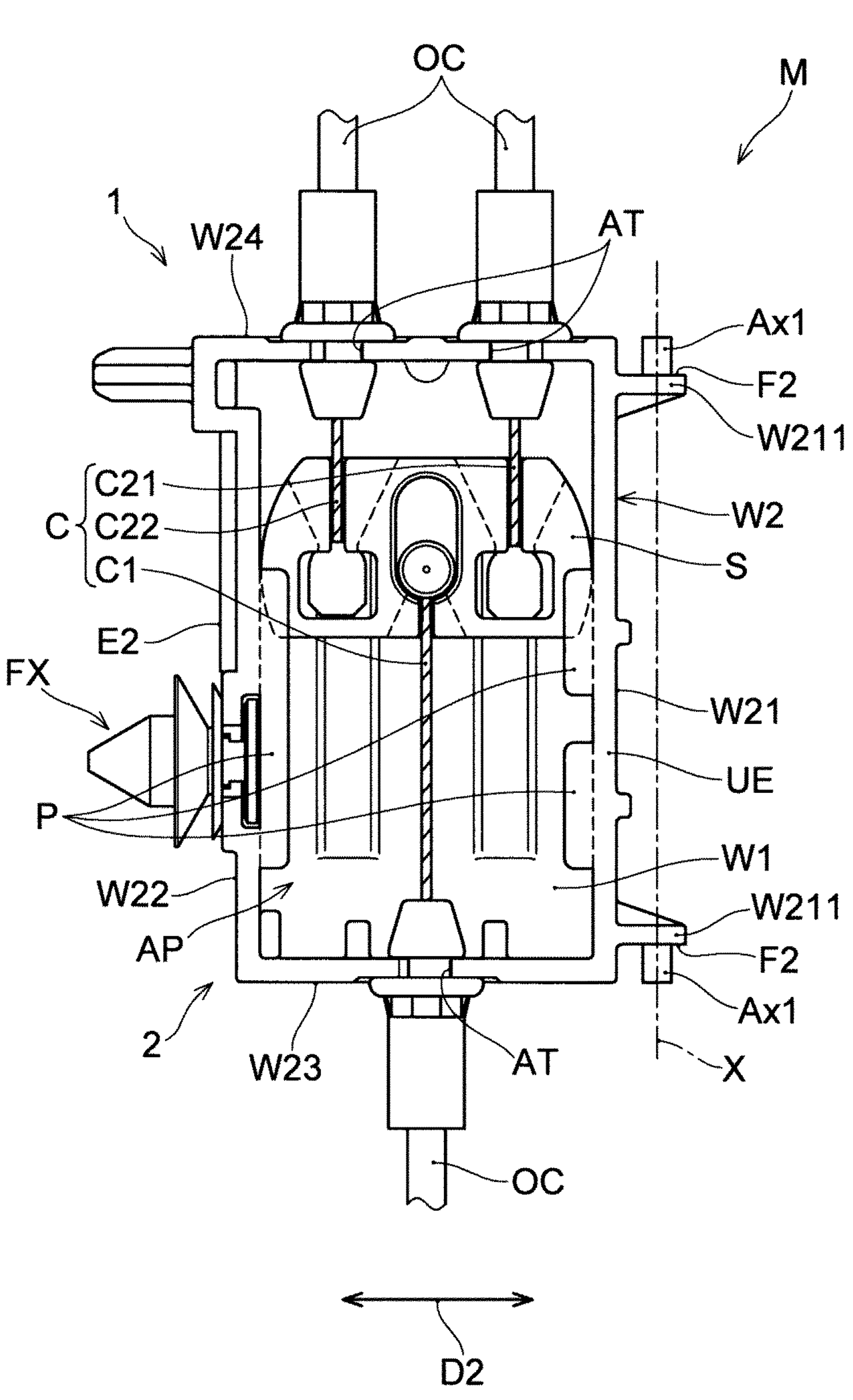
FIG. 6 is a top view showing the state in which a slider and cables are connected to the housing of FIG. 1.

As shown in FIGS. 1 and 2, the housing 1 has an interior space defined by the bottom wall W1, the side wall W2, and the lid 3, and is opened/closed by the lid 3. A part or all of predetermined members is housed in the interior space of the housing 1. In the present embodiment, as shown in FIGS. 5 and 6, the housing 1 is configured such that the cable C to be routed to a vehicle V is connected to the housing 1. Specifically, as shown in FIG. 6, a slider S mutually connecting a plurality of cables C to be routed to the vehicle V and a part of the cables C connected to the slider S are housed in the housing 1.

In the present embodiment, as shown in FIGS. 5 and 6, the housing 1 is provided as a part of a cable coupling mechanism M. Specifically, as shown in FIG. 6, the cable coupling mechanism M comprises the housing 1, a cable (operating cable) C1, a cable C21 operated by the operating force of the cable C1 (a first operated cable), a cable C22 operated by the operating force of the cable C1 (a second operated cable), and the slider S housed in the housing 1, to which the ends of the cables C1, C21, and C22 are connected. Besides, in the present specification, the cables C1, C21, and C22 can simply be referred to as the cable C collectively.

In the present embodiment, as shown in FIG. 5, the cable C1 is directly or indirectly connected to an operating portion OP1 and is operated by an operation of the operating portion OP1. The cable C1 can be configured to be an inner cable of a publicly-known control cable. The cable C1 can be housed in an outer casing OC (see FIG. 6) of a control cable between the housing 1 and the operating portion OP1.

The cables C21, C22 are coupled to the cable C1 via the slider S so that the cables C21, C22 are operated via the slider S that slides in the housing 1 by an operation of the cable C1. The cables C21, C22 are directly or indirectly connected to operated portions OP21, OP22, respectively. When the cables C21, C22 are operated, the operated portions OP21, OP22 are operated. The cables C21, C22 can be configured to be inner cables of a publicly-known control cable. The cables C21, C22 can be housed in the outer casing OC (see FIG. 6) of the control cable between the housing 1 and the operated portions OP21, OP22.

In the present embodiment, as shown in FIG. 5, the cable coupling mechanism M is a lock releasing mechanism to release locking of a hood H of the vehicle V, which is a mounting target. The cable coupling mechanism M is configured to unlock two locking members (the operated portion OP21 and the operated portion OP22) by operating a hood opener (the operating portion OP1) provided in the driver's seat of the vehicle V. In the present embodiment, the housing 1 is provided in an engine room or in proximity to the engine room of the vehicle V.

It should be noted that the housing may be provided in another unlock mechanism such as a seat reclining mechanism having two locking members, for example, or another cable coupling mechanism. Moreover, a mounting target of the cable coupling mechanism is the vehicle V in the present embodiment, but can be another structure besides a vehicle.

Moreover, a plurality of (three) cables C1, C21, C22 is connected to the housing 1 in the present embodiment, but the number of cables connected to the housing 1 can be one or can be a plurality. In a case that a plurality of cables is coupled in the housing 1, the plurality of cables can be coupled one-to-one, can be coupled one-to-many, or can be coupled many-to-many. In the present embodiment, the cable C is connected to the housing 1 via the slider S, but cable C can be connected to a member other than the slider S (for example, an operated member operated by a cable) or can be directly connected to the housing 1 (housing body 2).

The slider S is a moving member configured to slide in the housing 1. In the present embodiment, as shown in FIG. 6, the cables C1, C21, and C22 are connected to the slider S. When the cable C1 is operated, the slider S moves to one side (downward) in a sliding direction (axial direction X; up/down direction in FIG. 6) of the slider S. By the movement of the slider S to one side in the sliding direction, the cables C21 and C22 are pulled to one side in the sliding direction.

As shown in FIGS. 1 and 6, the housing body 2 has the bottom wall W1 and the side wall W2, and has the aperture AP opened to oppose the bottom wall W1. Apart or all of predetermined members, which is housing target, is housed in the interior space of the housing body 2. In the present embodiment, the slider S, and a part of the cables C1, C21, and C22 are housed in the housing body 2. The aperture AP of the housing body 2 is closed by the lid 3 (see FIG. 2) in a state in which the members are housed in the housing body 2. It should be noted that in FIGS. 1 to 4, for convenience of explanations, illustrations of the slider S, and cables C1, C21, C22 are omitted, and FIG. 6 is illustrated with the lid 3 being removed.

A material constituting the housing body 2 is not limited as long as it is a material having a predetermined rigidity. Preferably, the housing body 2 is configured to have a predetermined rigidity and to be slightly bent when an external force is applied to the housing body 2. For example, the housing body 2 may be formed of a synthetic resin or metal.

The overall shape of the housing body 2 is not limited as long as the housing body 2 can house a predetermined member, which is a housing target. In the present embodiment, as shown in FIGS. 1 and 6, the housing body 2 is formed in a substantially rectangular box shape having the aperture AP on one side. In the present embodiment, as shown in FIGS. 1 and 6, the housing body 2 is formed in a substantially rectangular box shape by the bottom wall W1 formed in a substantially rectangular shape and the side wall W2 erected in a rectangular frame shape from the bottom wall W1. More specifically, the side wall W2 comprises a first side wall W21 extending along a rotational axis X, a second side wall W22 opposing the first side wall W21, a third side wall W23 extending toward the second side wall W22 from the end portion on one side in the axial direction X of the first side wall W1, and a fourth side wall W24 extending toward the second side wall W22 from the end portion on the other side in the axial direction X of the first side wall W21.

The bottom wall W1 is a wall-shaped portion defining the interior space of the housing body 2, along with the side wall W2. The bottom wall W1 is configured to at least partially support a housing target to be housed in the housing body 2. In the present embodiment, the bottom wall W1 is formed in a plate shape, and the inner surface of the bottom wall W1 serves as a sliding surface for the slider S to slide in the housing 1. The shape and structure of the bottom wall W1 are not limited as long as the bottom wall W1 is configured to partially support the housing target. The bottom wall W1 may have a through hole passing through the bottom wall W1 in the thickness direction.

The side wall W2 is a wall-shaped portion defining the interior space of the housing body 2, along with the bottom wall W1. The side wall W2 is erected in a direction away from the inner surface of the bottom wall W1. The upper end UE (see FIG. 1) of the side wall W2, which is on the aperture AP side of the side wall W2 (an end far from the bottom wall W1), opposes the back surface 31 of the lid 3 in the closed state in which the lid 3 closes the aperture AP. The side wall W2 extends in a direction perpendicular to the inner surface of the bottom wall W1 (a height direction D3) in the present embodiment, but the side wall W2 may extend at an angle with respect to a direction perpendicular to the inner surface of the bottom wall W1. In the present embodiment, as shown in FIG. 6, when viewed from a direction perpendicular to the inner surface of the bottom wall W1, the first side wall W21, the second side wall W22, the third side wall W23, and the fourth side wall W24 are formed to be arranged in a substantially rectangular shape. Specifically, the first side wall W21 and the second side wall W22 extend parallel to each other and perpendicularly to the inner surface of the bottom wall W1. Moreover, as shown in FIG. 6, the third side wall W23 and the fourth side wall W24 extend parallel to each other, perpendicularly to the inner surface of the bottom wall W1 and perpendicularly to the inner surface of the first side wall W21 and the second side wall W22. However, when viewed from a direction perpendicular to the inner surface of the bottom wall W1, the side wall may have other shapes, such as circular, elliptical, or polygonal shapes other than a rectangular shape.

In order to rotate the lid 3 with respect to the housing body 2, in a case that a bearing portion Ax2 is provided to the lid 3 as shown in FIGS. 1 to 4, a shaft portion Ax1 is provided to the side wall W2. In a case that a shaft portion is provided to the lid 3, which is a variation of the embodiment shown, a bearing portion is provided to the side wall W2. In the present embodiment, as shown in FIGS. 1 to 4 and FIG. 6, the shaft portion Ax1 is provided to the first side wall W21, the bearing portion Ax2 provided to the lid 3 is attached to the shaft portion Ax1 of the first side wall W21, and the lid 3 rotates around the shaft portion Ax1. The shaft portion Ax1 (or the bearing portion) may be provided to other side walls besides the first side wall W21 (for example, the third side wall W23 and the fourth side wall W24). The shaft portion Ax1 and the bearing portion Ax2 will be explained below.

In the present embodiment, as shown in FIGS. 1 and 6, the side wall W2 has, on one side and on the other side in the axial direction X, an outer casing attaching portion AT, to which the outer casing OC of a control cable is attached. Specifically, the outer casing attaching portion AT is a part notched in a concave shape toward the bottom wall W1 side from the upper end UE of the side wall W2 (the third side wall W23 and the fourth side wall W24).

In the present embodiment, as shown in FIGS. 1 and 6, the side wall W2 (the first side wall W21 and the second side wall W22) has a separation preventing portion P projecting by a predetermined amount in the width direction D2 of the housing 1 from the inner edge of the upper end UE of the side wall W2. The separation preventing portion P extends with a predetermined length in the axial direction X. As shown in FIG. 6, the separation preventing portion P is opposed in a direction perpendicular to the inner surface of the bottom wall W1 (the height direction D3) at both ends in the width direction D2 of the slider S. Therefore, it is suppressed that the slider S housed in the housing 1 is separated from the housing 1. A non-formed region of the side walls W21, W22, in which the separation preventing portion P is not provided, is formed to be longer than the length of the slider S in the axial direction X. In this case, via the non-formed region, in which the separation preventing portion P is not provided, the slider S can be easily housed in the housing 1 and removed from the housing 1.

In the present embodiment, as shown in FIG. 6, the second side wall W22 is provided with a fixing portion FX to mount the housing 1 to a mounting target. In this case, a portion of the side wall W2 of the housing 1 is fixed to the mounting target via the fixing portion FX, and the housing 1 is fixed to a predetermined position of the mounting target. It should be noted that the fixing portion FX may be provided to other parts of the housing 1, such as other side walls W21, W23, W24, the bottom wall W1, the lid 3, and the like.

The lid 3 is attached to the housing body 2 such that the lid 3 can rotate around the rotational axis X by means of the shaft portion Ax1 and the bearing portion Ax2. The lid 3 moves in a closing direction in the opening/closing direction D1 to cover and close the aperture AP of the housing body 2 and moves in an opening direction in the opening/closing direction D1 so that it is possible to access the interior space of the housing body 2 from the aperture AP of the housing body 2 (for example, to remove the slider S or the cable C from the interior space). The lid 3 has a front surface 32 to be the outer surface of the housing 1 in the closed state of the lid 3 (see FIG. 2) and the back surface 31 opposing the upper end UE of the side wall W2 in the closed state of the lid 3. In the present embodiment, the lid 3 has, at both ends in the axial direction X of the base end portion of the lid 3, the bearing portion Ax2 projecting substantially perpendicularly to the back surface 31 of the lid 3.

A material constituting the lid 3 is not limited as long as it is a material having a predetermined rigidity. Preferably, the lid 3 is configured to have a predetermined rigidity and to be slightly bent when an external force is applied to the lid 3. For example, the lid 3 may be formed of a synthetic resin or metal and the like.

The overall shape of the lid 3 is not limited as long as the lid 3 is configured to close the aperture AP of the housing body 2. It should be noted that the term "close" here means that the aperture AP can be closed such that a housing target to be housed in the housing body 2 is prevented from separating from the housing body 2. Therefore, as long as the aperture AP of the housing body 2 is partially covered such that the housing target is prevented from separating from the aperture AP, for example, the lid 3 does not need to cover the entirety of the aperture AP, and the lid 3 may have a through hole penetrating between the front surface 32 and the back surface 31. In the present embodiment, the lid 3 is formed in a substantially rectangular shape with one size greater than that of the aperture AP so that the lid 3 can cover the entirety of the substantially rectangular-shaped aperture AP.

In the present embodiment, the housing body 2 and/or the lid 3 has, in a tip end region R1 to be on the side far from the rotational axis X, an engaging portion E1 (see FIGS. 1 and 2) to hold the housing body 2 and the lid 3 in the state in which the lid 3 closes the aperture AP. The engaging portion E1 engages an engaged portion E2 provided to the housing body 2 and/or the lid 3 to hold the lid 3 in the closed state. It should be noted that the "tip end region R1" is a region of the housing body 2 or the lid 3 from a distal position (tip end) being farthest from the axis X to a position at a distance of less than or equal to ½ of the distance between the distal position and the axis X, more preferably, from the distal position to a position at a distance of less than or equal to between ¼ and ⅓ of the distance between the distal position and the axis X. The "base end region R2" is a region of the housing body 2 or the lid 3 from the axis X (the base end) to a position at a distance of less than or equal to ½ of the distance between the distal position and the axis X, more preferably, from the axis X to a position at a distance of less than or equal to between ¼ and ⅓ of the distance between the distal position and the rotational axis X.

In the present embodiment, the engaging portion E1 is an engaging claw provided to the tip end region R1 of the lid 3. More specifically, as shown in FIG. 2, the engaging portion E1 is an engaging claw extending in a direction approaching the bottom wall W1 in the height direction D3 on the outer surface side of the second side wall W22 from the tip end portion of the lid 3 that extends along the upper end of the second side wall W22 when the lid 3 is the closed state. On the other hand, the engaged portion E2 is provided at a position of the outer surface of the second side wall W22, which is a position corresponding to the position of the engaging portion E1 (the engaging claw) of the lid 3 in the closed state. The engaged portion E2 is an engagement step which can engage the engaging portion E1 in the opening/closing direction D1.

The shape and structure of the engaging portion E1 is not limited as long as the engaging portion E1 can maintain the closed state of the lid 3, so that the engaging portion E1 may have a publicly-known engagement structure other than the engaging claw. In the present embodiment, the engaging portion E1 is provided to the lid 3 and the engaged portion E2 is provided to the housing body 2. However, an engaging portion (engaging claw) may be provided to the housing body 2 and an engaged portion (engagement step) may be provided to the lid 3, or an engaging portion may be provided to both the lid 3 and the housing body 2 and an engaged portion may be provided to both the lid 3 and the housing body 2. In the present embodiment, the engaging portion E1 and the engaged portion E2 are configured to engage each other in the second side wall W22. However, an engaging portion and an engaged portion may be configured to engage each other in the third side wall W23/the fourth side wall W24.

As described above, one of the housing body 2 and the lid 3 has the shaft portion Ax1 and the other one of the housing body 2 and the lid 3 has the bearing portion Ax2 to support the shaft portion Ax1 such that the lid 3 rotates around the rotational axis X. The shaft portion Ax1 and the bearing portion Ax2 form a bearing structure to rotate the lid 3 with respect to the housing body 2. As shown in FIG. 1, the housing body 2 has the shaft portion Ax1 and the lid 3 has the bearing portion Ax2 in the present embodiment, but the housing body 2 may have a bearing portion and the lid 3 may have a shaft portion.

The positions at which the shaft portion Ax1 and the bearing portion Ax2 are provided are not limited as long as the lid 3 can be rotated with respect to the housing body 2. The bearing structure formed by the shaft portion Ax1 and the bearing portion Ax2 is provided at a position along the first side wall W21 in the present embodiment, but it can be provided at a position along the third side wall W23 and the fourth side wall W24, for example.

The shaft portion Ax1 is supported to the bearing portion Ax2 such that the lid 3 can rotate around the axis X with respect to the housing body 2. The shape and structure of the shaft portion Ax1 and the bearing portion Ax2 are not limited as long as the lid 3 is configured to rotate around the axis X with respect to the housing body 2. In the present embodiment, the shaft portion Ax1 has a cylindrically-shaped portion extending in the axial direction X, and the bearing portion Ax2 has an insertion portion (a circular through-hole, or an insertion channel whose inner surface has a partially arc-shaped portion), through which the cylindrically-shaped portion of the shaft portion Ax1 can be inserted.

The shaft portion Ax1 itself is configured to not rotate as a part of the housing body 2 in the present embodiment, but the shaft portion Ax1 rotates with respect to the bearing portion Ax2 in a case that the shaft portion Ax1 is provided to the lid 3. At least a part of the outer periphery of the shaft portion Ax1 is covered by the bearing portion Ax2, and it is suppressed that the lid 3 is separated from the housing body 2 during relative rotation between the shaft portion Ax1 and the bearing portion Ax2. With respect to the shaft portion Ax1, the entire periphery of the shaft portion Ax1 may be covered by the bearing portion Ax2, as in the shaft portion Ax1 on the left side of FIG. 3, or only a portion of the outer periphery of the shaft portion Ax1 is covered by the bearing portion Ax2 and the other portion of the outer periphery of the shaft portion Ax1 is not covered by the bearing portion Ax2, as in the shaft portion Ax1 on the right side of FIG. 4. In the present embodiment, after the shaft portion Ax1 provided on one side of the lid 3 in the axial direction X is inserted through the bearing portion Ax2 having a through hole penetrated in the axial direction X, the shaft portion Ax1 provided on the other side of the lid 3 in the axial direction X may be fit in the bearing portion Ax2 formed in a U-letter shape. Therefore, it is possible to facilitate the attachment of the lid 3 to the housing body 2.

As described below, between the shaft portion Ax1 and the bearing portion Ax2, a predetermined gap (see FIGS. 7 and 8) is formed in a direction away from the axial center (the axis X) of the shaft portion Ax1 (radially outward from the shaft portion Ax1). This facilitates relative rotation between the shaft portion Ax1 and the bearing portion Ax2. By the gap formed between the shaft portion Ax1 and the bearing portion Ax2, in the closed state of the lid 3, as described below, an opening/closing direction gap G2 in the opening/closing direction D1 is generated between the shaft portion Ax1 and the bearing portion Ax2.

Figure 8:
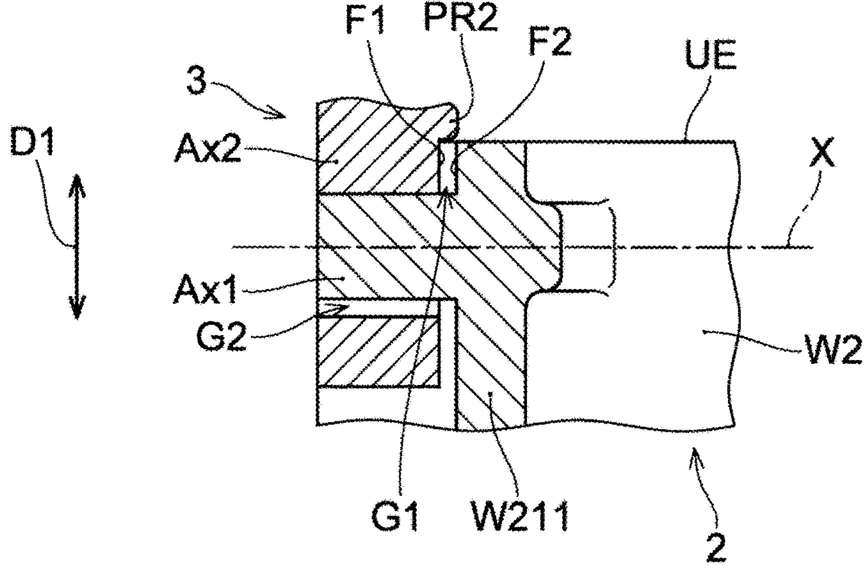
FIG. 8 is a cross-sectional view taken along a line A-A in FIG. 7.
Figure 10:
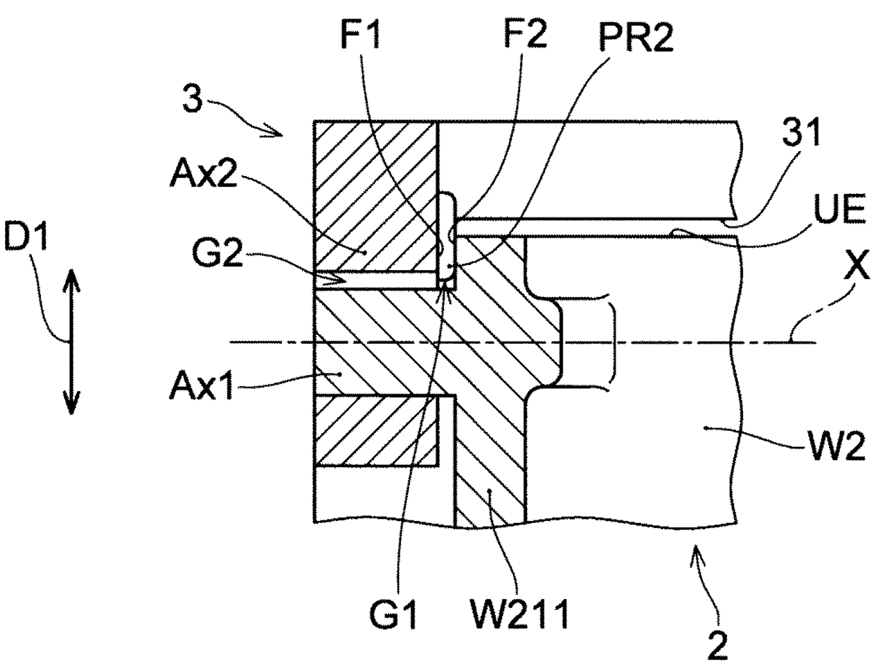
FIG. 10 is a cross-sectional view taken along a line B-B in FIG. 9.

As shown in FIGS. 8 and 10, the side wall W2 has an opposing surface (second axial direction opposing surface) F2 opposed in the axial X direction of the rotational axis X to an opposing surface (first axial direction opposing surface) F1 provided to the lid 3 in the state in which the lid 3 closes the aperture AP of the housing body 2. At least in the state in which the lid 3 closes the aperture AP, the opposing surface (first axial direction opposing surface) F1 and the opposing surface (second axial direction opposing surface) F2 are configured to be pressed against each other in the axial direction X. In the present embodiment, the opposing surface F1 and the opposing surface F2 are configured to be pressed against each other in the axial direction X via a projecting portion PR2 to be described below. However, it should be noted that, as in a second embodiment to be described below, the opposing surface F1 and the opposing surface F2 may be configured to be pressed against each other directly. Moreover, the opposing surface F1 and the opposing surface F2 may be configured to be pressed against each other only in the state in which the lid 3 closes the aperture AP or in proximity thereto (a closure proximity region to be described below), or may be configured to be pressed against each other in a region other than in the closure proximity region (for example, all the time).

In the present embodiment, an axial direction gap G1 of a predetermined size is provided in the axial direction X between the opposing surface F1 and the opposing surface F2. In the present embodiment, this axial direction gap G1 is to be the cause of rattling in the axial direction X between the shaft portion Ax1 and the bearing portion Ax2. The size of the axial direction gap G1 corresponds to the size of a gap that allows the relative movement in the axial direction X between the shaft portion Ax1 and the bearing portion Ax2. However, for example, as described below, in a case that the first axial direction opposing surface and the second axial direction opposing surface are provided in a portion different from a part in which the shaft portion Ax1 and the bearing portion Ax2 are provided, the size of the axial direction gap G1 does not need to be the same as the size of the gap that allows the relative movement in the axial direction X between the shaft portion Ax1 and the bearing portion Ax2.

Details will be explained below, but the opposing surface F1 and/or the opposing surface F2 has the projecting portion (the second projecting portion) PR2 (see FIGS. 1, 3, and 4) projecting in the axial direction X from the opposing surface F1 and/or the opposing surface F2. Details of the projecting portion PR2 will be explained below, but by the projecting portion PR2, the opposing surface F1 and the opposing surface F2 are pressed against each other in the axial direction X at least in the state in which the lid 3 closes the aperture AP, and, in the closed state of the lid 3, the relative movement of the lid 3 with respect to the housing body 2 in the axial direction X is suppressed.

The shape, structure and the position to be provided of the opposing surface F1 and opposing surface F2 are not limited as long as the opposing surface F1 and the opposing surface F2 oppose each other in the axial direction X and at least one of the opposing surface F1 and the opposing surface F2 has the projecting portion PR2. In the present embodiment, as shown in FIGS. 1 and 8, the opposing surface F1 and the opposing surface F2 are provided at a position of the housing 1, at which the shaft portion Ax1 and the bearing portion Ax2 are provided. However, the first axial direction opposing surface and the second axial direction opposing surface may be separately provided in a portion different from a part in which the shaft portion Ax1 and the bearing portion Ax2 are provided. For example, between a pair of bearing structures (the shaft portion Ax1 and the bearing portion Ax2) provided at both ends in the axial direction X of the lid 3 and the first side wall W21 (for example, at a position at which the projecting portion PR1 is provided in an embodiment shown in FIG. 1), a pair of projecting pieces projecting from the outer surface of the first side wall W21 may be provided, and the first axial direction opposing surface and the second axial direction opposing surface may be provided to each of the pair of projecting pieces.

In the present embodiment, the opposing surface F1 is a portion, which opposes the opposing surface F2 at which the shaft portion Ax1 is provided, of the bearing portion Ax2 provided on both sides of the lid 3 in the axial direction X on the base end side of the lid 3.

Moreover, the opposing surface F2 is a portion, which opposes the opposing surface F1, of a projecting piece W211 (see FIGS. 3 and 4) projecting to the outer side (in the width direction D2) from the outer surface of the first side wall W21 of the housing body 2 and having the shaft Ax1. The opposing surface F1 and the opposing surface F2 oppose in the axial direction X in a region along the first side wall W21. However, in a case that the shaft portion Ax1 and the bearing portion Ax2 are provided to the third side wall W23 and the fourth side wall W24, and the like, for example, the first axial direction opposing surface and the second axial direction opposing surface may oppose in the axial direction X in a region along the third side wall W23 or the fourth side wall W24.

Figure 9:
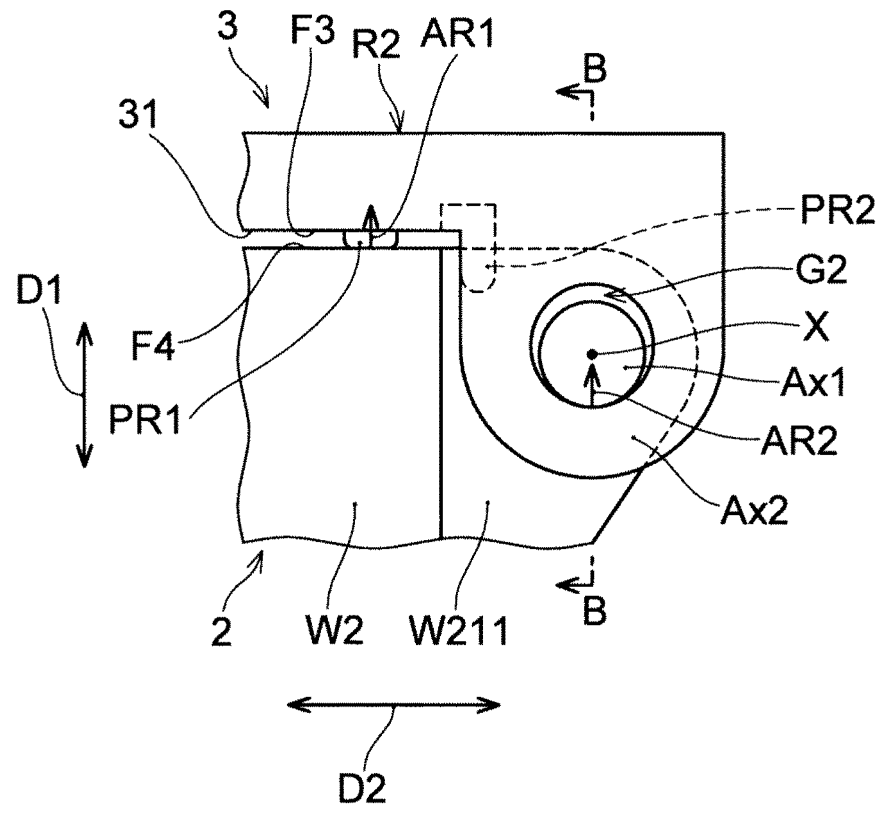
FIG. 9 is a schematic view in which the periphery of the shaft portion and the bearing portion of the housing is viewed in the axial direction when the lid is in the closed state.

As shown in FIG. 9, the side wall W2 has, in the base end region R2 to be the rotational axis X side, an opposing surface (a second opening/closing direction opposing surface) F4 opposed in the opening/closing direction D1 of the lid 3 to an opposing surface (a first opening/closing direction opposing surface) F3 provided to the lid 3 in the state in which the lid 3 closes the aperture AP. Moreover, details will be explained below, but the opposing surface F3 and/or the opposing surface F4 has the projecting portion PR1 projecting in the opening/closing direction D1 from the opposing surface F3 and/or the opposing surface F4. Details of the projecting portion PR1 will be explained below, but by the projecting portion PR1, the relative movement of the lid 3 with respect to the housing body 2 in the opening/closing direction D1 is suppressed in the closed state of the lid 3.

The opposing surface F3 is a surface opposing the fourth opposing surface F4 of the side wall W2 in the opening/closing direction D1 (the height direction D3) in the base end region R2 of the lid 3 when the lid 3 is in the closed state. The opposing surface F4 is a surface opposing the third opposing surface F3 of the lid 3 in the opening/closing direction D1 (the height direction D3) in the base end region R2 of the side wall W2 when the lid 3 is in the closed state. The position, shape, and structure of the opposing surface F3 and the opposing surface F4 are not limited as long as the opposing surface F3 and the opposing surface F4 are surfaces opposing each other in the base end region R2. In the present embodiment, as shown in FIG. 1, the opposing surface F4 is an upper end UE of the first side wall W21 and the opposing surface F3 is a surface of the back surface 31 of the lid 3, which opposes the upper end UE of the first side wall W21. However, the opposing surface F4 may be, for example, an upper end of the third side wall W23 and the fourth side wall W24, and the opposing surface F3 may be a surface of the back surface 31 of the lid 3, which opposes an upper end of the third side wall W23 and the fourth side wall W24. Moreover, for example, the position in the height direction D3 of the second opening/closing direction opposing surface may be a position further above or a position further below the upper end UE of the side wall W2 depending on the position of the first opening/closing direction opposing surface in the height direction D3.

Next, details of the projecting portion (second projecting portion) PR2 will be explained. In the present embodiment, in addition to the projecting portion PR1 to be described below, the projecting portion PR2 is provided, but it should be noted that the projecting portion PR2 does not necessarily have to be provided.

The projecting portion PR2 is a projecting portion projecting in the axial direction X from the opposing surface F1 and/or the opposing surface F2. The projecting portion PR2 may be provided to the opposing surface F1 to be the lid 3 side, may be provided to the opposing surface F2 to be the housing body 2 side, or may be provided to both the opposing surface F1 and the opposing surface F2.

Figure 7:
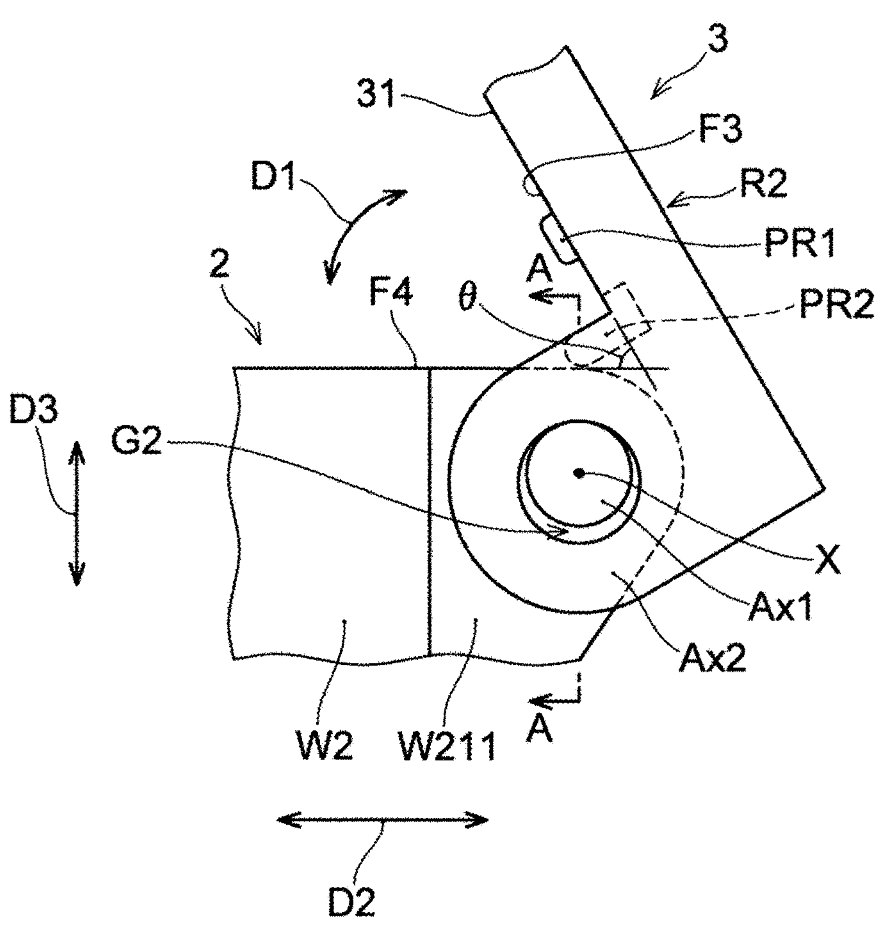
FIG. 7 is a schematic view in which the periphery of a shaft portion and a bearing portion of the housing is viewed in the axial direction when the lid is in the opened state.

In the present embodiment, the amount of projection of the projecting portion PR2 in the axial direction X is greater than the size of the axial direction gap G1 generated in the axial direction X between the opposing surface F1 and the opposing surface F2, and the projecting portion PR2 is configured to fit into the axial direction gap G1 in the state in which the lid 3 closes the aperture AP. Here, the term "fit into the axial direction gap G1" is the state in which the projecting portion PR2 is press-fitted into the axial direction gap G1. The amount of projection of the projecting portion PR2 is not limited as long as the projecting portion PR2 can fit into the axial direction gap G1 to suppress the relative movement of the lid 3 with respect to the housing body 2 in the axial direction X as described below. Moreover, the shape of the projecting portion PR2 is not limited as long as the projecting portion PR2 can fit into the axial direction gap G1 to suppress the relative movement of the lid 3 with respect to the housing body 2 in the axial direction X. In the present embodiment, the bearing portion Ax2 provided at both ends in the axial direction X of the base end portion of the lid 3 has the opposing surface F1 extending substantially perpendicular to the axis X, and the projecting portion PR2 projects in the axial direction X with respect to the opposing surface F1. Moreover, when viewed in the axial direction X, as shown in FIG. 7, the projecting portion PR2 extends in a direction substantially perpendicular to the back surface 31 of the lid 3. A tip end portion, which first fits into the axial direction gap G1, of the projecting portion PR2 is configured to be tapered by a curved surface, such as being beveled, an inclined surface, and the like, facilitating fitting into the axial direction gap G1.

As described above, in a case that the projecting portion PR2 is provided to the housing 1, and the amount of projection in the axial direction X of the projecting portion PR2 is greater than the size of the axial direction gap G1, the relative movement of the lid 3 with respect to the housing body 2 in the axial direction X is suppressed in the state in which the projecting portion PR2 being fitted into the axial direction gap G1 as shown in FIG. 10. Below, this point will be explained in more detail. As shown in FIG. 8, in a case that the projecting portion PR2 is not fitted into the axial direction gap G1, the axial direction gap G1 between the opposing surface F1 and the opposing surface F2 allows the relative movement of the lid 3 with respect to the housing body 2 in the axial direction X. In a case that the projecting portion PR2 is not fitted into this axial direction gap G1 when the lid 3 is closed, the lid 3 can relatively move with respect to the housing body 2 in the axial direction X. In that case, rattling and abnormal noise caused by the relative movement of the lid 3 with respect to the housing body 2 in the axial direction X are generated. As shown in FIG. 10, the projecting portion PR2 fits into the axial direction gap G1, thereby the axial direction gap G1 is filled, and the lid 3 is regulated in relatively moving in the axial direction X with respect to the housing body 2. In the present embodiment, when the projecting portion PR2 fits between the opposing surface F1 and the opposing surface F2 in the closed state of the lid 3, the projecting portion PR2 is subjected to a reaction force from the opposing surface F2 in a direction perpendicular to the opposing surface F2 (the left side in FIG. 10). In the present embodiment, the opposing surface F1, the opposing surface F2, and the projecting portion PR2 are provided on each of both sides of the housing 1 in the axial direction X, and the projecting portion PR2 on one side and the projecting portion PR2 on the other side in the axial direction X are subjected to reaction force in the opposite direction with each other in the axial direction X from the opposing surface F2. In this way, the relative movement of the lid 3 with respect to the housing body 2 in the axial direction X is regulated in the state in which the projecting portions PR2 fit into the axial direction gaps G1. Therefore, it is suppressed that abnormal noise caused by the lid 3 and the housing body 2 making contact and non-contact repeatedly in the axial direction X is generated when the vibration and the like is applied to the housing 1.

The positional relationship between the opposing surface F1 and the opposing surface F2 is not limited as long as the projecting portion PR2 can fit into the axial direction gap G1 such that the relative movement of the lid 3 with respect to the housing body 2 in the axial direction X can be regulated. The opposing surface F1 and the opposing surface F2 are provided such that the opposing surface F2 is on the inner side (a side, which is near the center portion in the axial direction X, of the side wall W2) in the axial direction X with respect to the opposing surface F1 in the present embodiment. However, the opposing surface F1 and the opposing surface F2 may be arranged in another positional relationship. For example, the opposing surface F1 and the opposing surface F2 may be provided such that the opposing surface F1 is on the inner side (a side, which is near the center portion in the axial direction X, of the side wall W2) in the axial direction X with respect to the opposing surface F2. In the present embodiment, one opposing surface F1, one opposing surface F2, and one axial direction gap G1 are provided on each of both sides in the axial direction X. However, for example, only one fitting structure (press-fitting structure) constituted by a first axial direction opposing surface, a second axial direction opposing surface, and an axial direction gap, for example, may be provided along the axial direction X. For example, in FIG. 8, by providing a wall portion on the left side of the bearing portion Ax2 of the lid 3 to regulate movement of the lid 3 in a direction away from the opposing surface F2 when the projecting portion PR2 is fitted into the axial direction gap G1, it is not necessary to provide a fitting structure at a portion of the other shaft and bearing portion not shown. Also in this case, the projecting portion PR2 can fit (be press-fitted) into the axial direction gap G1, so that the relative movement of the lid 3 with respect to the housing body 2 in the axial direction X can be regulated.

The projecting portion PR2 may be fitted into the axial direction gap G1 in the state in which the lid 3 closes the aperture AP, so that the projecting portion PR2 may always be fitted into the axial direction gap G1 in the course of opening/closing of the lid 3, or it can be fitted into the axial direction gap G1 in a part of the course of opening/closing of the lid 3. In the present embodiment, the projecting portion PR2 is provided to the opposing surface F1 provided to the lid 3, the projecting portion PR2 is configured not to fit into the axial direction gap G1 (see FIG. 7) in the state in which the lid 3 is opened at a predetermined angle with respect to the housing body 2 from the closed state in which the lid 3 closes the aperture AP, and is configured to fit into the axial direction gap G1 in a closure proximity region to be in proximity to the closed state in which the lid 3 closes the aperture AP (see FIG. 9). In this case, up to the closure proximity region of the lid 3, since resistance to the opening/closing operation of the lid 3 is not likely to be applied, it is possible to make the opening/closing operation of the lid 3 smooth. It should be noted that the above-described "predetermined angle" of the lid 3 with respect to the housing body 2 is not limited. For example, an angle θ formed by the upper end UE of the side wall W2 and the back surface 31 of the lid 3 (see FIG. 7) may be set to be 600 or more, preferably 450 or more, and more preferably 300 or more. Moreover, the "closure proximity region" of the lid 3 is not limited, but, for example, the closure proximity region may be a position of the lid 3 when the angle θ formed by the upper end UE of the side wall W2 and the back surface 31 of the lid 3 is greater than 0 and less than 60°, preferably greater than 0 and less than 45°, and further preferably greater than 0 and less than 30°.

Next, details of the projecting portion PR1 will be explained below.

The projecting portion (first projecting portion) PR1 is a projecting portion projecting in the opening/closing direction D1 from the opposing surface (first opening/closing direction opposing surface) F3 and/or the opposing surface (second opening/closing direction opposing surface) F4. The projecting portion PR1 may be provided to the opposing surface F3 to be the lid 3 side, may be provided to the opposing surface F4 to be the housing body 2 side, or may be provided to both the opposing surface F3 and the opposing surface F4.

The amount of projection of the projecting portion PR1 in the opening/closing direction D1 is greater than the size of the opening/closing direction gap G2 (see FIG. 7) generated in the opening/closing direction D1 between the shaft portion Ax1 and the bearing portion Ax2, and the shaft portion Ax1 is configured to be pressed against the bearing portion Ax2 in the opening/closing direction D1 by the projecting portion PR1 being pressed against the opposing surface F3 and/or the opposing surface F4 in the opening/closing direction D1 in the state in which the lid 3 closes the aperture AP and is held to the housing body 2. Details will be explained later, but, in this way, the relative movement of the lid 3 with respect to the housing body 2 in the opening/closing direction D1 is regulated.

The amount of projection of the projecting portion PR1 is not limited as long as the shaft portion Ax1 is configured to be pressed against the bearing portion Ax2 in the opening/closing direction D1 by the projecting portion PR1 being pressed against the opposing surface F3 and/or the opposing surface F4 in the opening/closing direction D1 in the state in which the lid 3 closes the aperture AP and is held to the housing body 2.

The shape of the projecting portion PR1 is not limited as long as the shaft portion Ax1 is configured to be pressed against the bearing portion Ax2 in the opening/closing direction D1 by the projecting portion PR1 being pressed against the opposing surface F3 and/or the opposing surface F4 in the opening/closing direction D1 in the state in which the lid 3 closes the aperture AP and is held to the housing body 2. In the present embodiment, the projecting portion PR1 is a projecting portion of a substantially rectangular shape extending along the axial direction X. Here, the term "the lid 3 is held to the housing body 2" means the state in which the lid 3 closes the aperture AP is maintained by the engaging portion E1, and the like. It should be noted that the lid 3 may be held to the housing body 2 by means other than the engaging portion E1.

Figure 14:
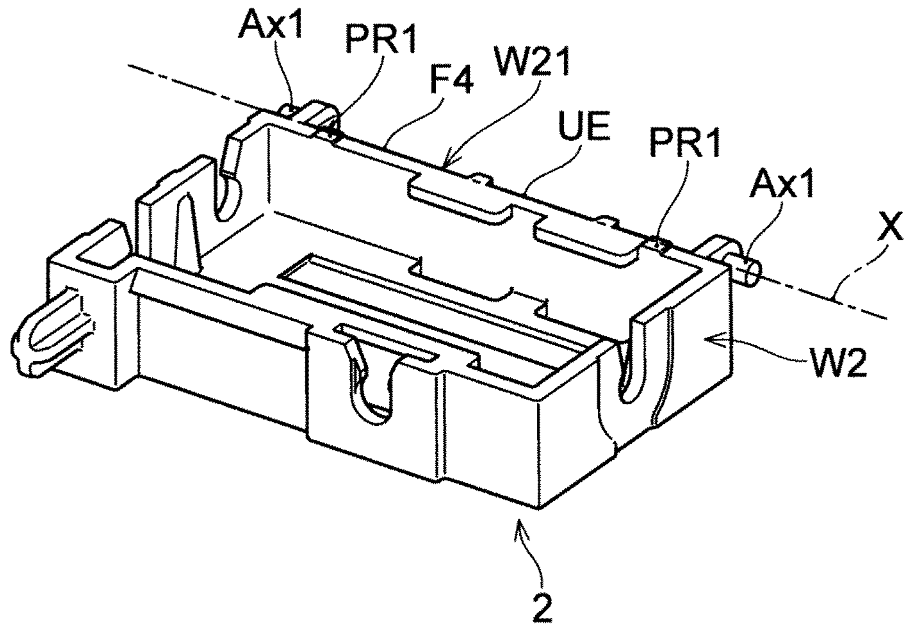
FIG. 14 is a schematic view showing a housing of a second embodiment, in which a projecting portion is provided to a housing body.

The position at which the projecting portion PR1 is provided is not limited as long as the projecting portion PR1 is provided in the base end region R2 of the lid 3 and/or the housing body 2. In the present embodiment, the projecting portion PR1 is provided to the base end region R2 of the back surface 31 of the lid 3 opposing the upper end UE of the first side wall W21. However, the projecting portion PR1 may be provided to the back surface 31 of the lid 3 opposing the upper end UE of the third side wall W23 and/or the fourth side wall W24, or may be provided to another part of the lid 3. As shown in FIG. 14, the projecting portion PR1 may be provided to the upper end UE of the first side wall W21, to the upper end UE of the third side wall W23 and/or the fourth side wall W24, or to a portion other than the above of the housing body 2.

In the present embodiment, as shown in FIG. 1, the projecting portion PR1 is provided, in a center region of the first side wall W21 in the axial direction X, so as to be pressed against the opposing surface F4. In a case that the projecting portion PR1 is provided in the center region in the axial direction X, the lid 3 is more likely to be bent and the lid 3 can be closed more easily in comparison to a case that the projecting portion PR1 is provided on the end side of the first side wall W21 in the axial direction X. It should be noted that the projecting portion may be configured to be pressed against the opposing surface F3 in a case that a projecting portion is provided to the first side wall W21 (see FIG. 14) and the like, and the projecting portion may be configured to be pressed against the opposing surface F3 and the opposing surface F4 in a case that the projecting portion is provided to both the first side wall W21 and the lid 3. Moreover, only one projecting portion PR1 is provided to the back surface 31 of the lid 3 in the present embodiment, but a plurality of projecting portions may be provided.

As described above, the amount of projection of the projecting portion PR1 in the opening/closing direction D1 is greater than the size of the opening/closing direction gap G2, the projecting portion PR1 is pressed against the opposing surface F3 and/or the opposing surface F4 in the opening/closing direction D1 in the state in which the lid 3 closes the aperture AP and is held to the housing body 2, and the shaft portion Ax1 is pressed against the bearing portion Ax2 in the opening/closing direction D1. In this way, the relative movement of the lid 3 with respect to the housing body 2 in the opening/closing direction D1 is regulated. Here, the term "pressed against in the opening/closing direction D1" includes not only the exact opening/closing direction D1, but also a direction being inclined with respect to the opening/closing direction D1. Moreover, the term "the shaft portion Ax1 is pressed against the bearing portion Ax2 in the opening/closing direction D1" means that a pressing force is applied in the opening/closing direction D1 between the shaft portion Ax1 and the bearing portion Ax2. Therefore, the term includes, as in the present embodiment, a case in which the bearing portion Ax2 relatively moves with respect to the shaft portion Ax1 so that a pressing force is applied in the opening/closing direction D1 between the shaft portion Ax1 and the bearing portion Ax2, and a case in which the shaft portion relatively moves with respect to the bearing portion so that a pressing force is applied in the opening/closing direction D1 between the shaft portion and the bearing portion.

Below, the effects related to the projecting portion PR1 will be explained in more detail.

Figure 11:
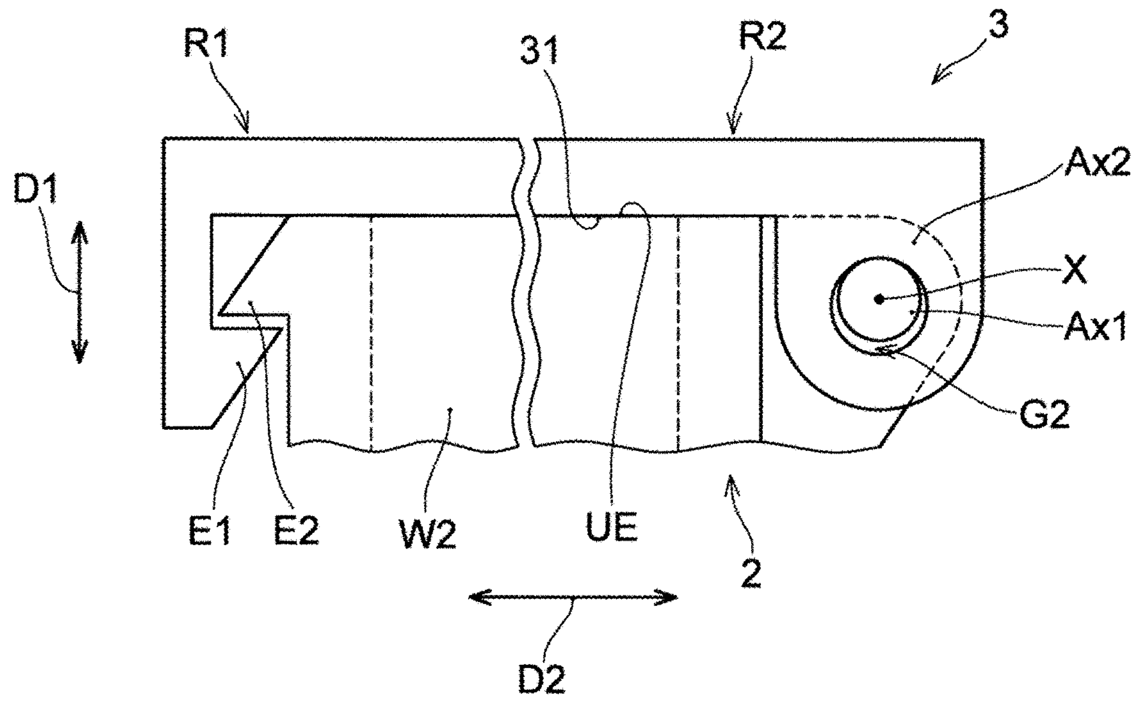
FIG. 11 is a reference view showing the periphery of the shaft portion and the bearing portion of the housing and the periphery of an engaging portion when the lid is in the closed state in a housing of a reference example, which does not have a second projecting portion.

As shown in FIGS. 7, 8, and 11, the opening/closing direction gap G2 is formed between the shaft portion Ax1 and the bearing portion Ax2. The opening/closing direction gap G2 is a gap generated by a clearance between the outer periphery of the shaft portion Ax1 and the inner surface of the bearing portion Ax2. As shown in FIG. 7, between the outer periphery of the shaft portion Ax1 and the bearing portion Ax2, a gap is generated in a direction other than the opening/closing direction D1. Here, "the size of the opening/closing direction gap G2" means the size of a gap when the shaft portion Ax1 is moved with respect to the bearing portion Ax2 such that a gap in the opening/closing direction D1 (the height direction D3) reaches the maximum (a gap having the largest size in the diameter direction of the shaft portion Ax1). It should be noted that, in the drawings, the size of the opening/closing direction gap G2 is shown exaggerated to simplify the explanations (the same applies to the axial direction gap G1). The opening/closing direction gap G2 allows the lid 3 in the closed state to move relatively in the opening/closing direction D1 (the height direction D3) with respect to the housing body 2. In this case, the vibration being applied to the housing 1 causes rattling and abnormal noise caused by the relative movement with respect to the housing body 2 to be generated.

Figure 12:
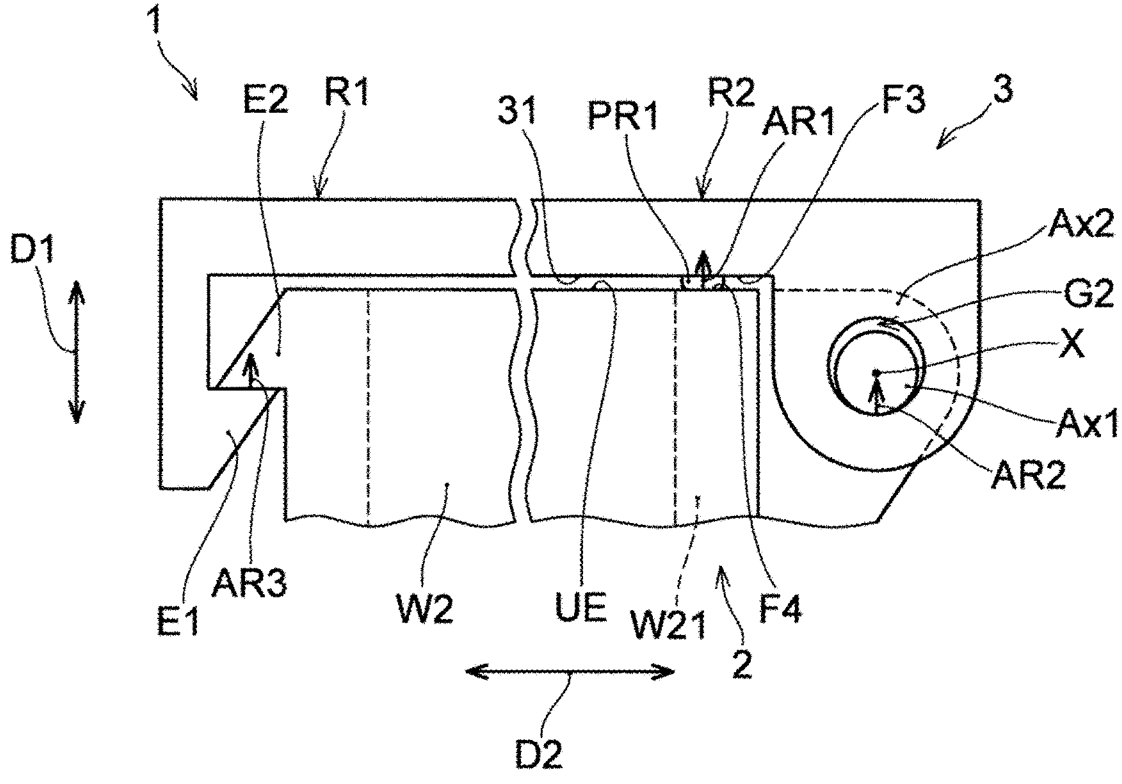
FIG. 12 is a schematic view in which the housing is viewed in the axial direction, which shows the periphery of the shaft portion and the bearing portion of the housing and the periphery of the engaging portion when the lid is in the closed state.

As shown in FIGS. 7 and 9, in a case that the projecting portion PR1 having the amount of projection being greater than the size of the opening/closing direction gap G2 is provided to the opposing surface F3, in the state in which the lid 3 is closed, the projecting portion PR1 abuts the opposing surface F4 and is pressed toward the opposing surface F4. More specifically, the lid 3 is configured to close the housing body 2 even in a case the lid 3 does not have the projecting portion PR1, and by providing the projecting portion PR1, the lid 3 is closed while a pressing force is applied toward the opposing surface F4 from the projecting portion PR1. In this way, a reaction force shown with an arrow AR1 is applied to the projecting portion PR1 from the opposing surface F4 in a direction perpendicular to the opposing surface F4 (on the upper side in FIG. 9). In this way, a force with which the lid 3 is lifted in a direction away from the opposing surface F4 is applied to the base end region R2 of the lid 3 in which the projecting portion PR1 is provided. Therefore, the bearing portion Ax2 of the lid 3 moves to the upper side in FIG. 9 with respect to the shaft portion Ax1. In this way, the shaft portion Ax1 is pressed against the bearing portion Ax2 in the opening/closing direction D1 (the height direction D3). To explain more specifically, in the present embodiment, as shown in FIG. 12, when the lid 3 is held to the housing body 2 by the engaging portion E1 in the state in which the lid 3 closes the aperture AP, the base end region R2 of the lid 3 is lifted in a direction away from the bottom wall W1 (the upper side in FIG. 12) with the projecting portion PR1 as a fulcrum, and the shaft portion Ax1 is pressed against the bearing portion Ax2. In the present embodiment, the lid 3 is held to the housing body 2 by the engaging portion E1. However, it should be noted that a means to hold the lid 3 in the state in which the lid 3 is closed is not limited to the engaging portion E1 as long as the housing 1 is configured such that the base end region R2 of the lid 3 is lifted in a direction away from the bottom wall W1 with the projecting portion PR1 as a fulcrum in the state in which the lid 3 is closed.

In this way, when the shaft portion Ax1 is pressed against the bearing portion Ax2 in the opening/closing direction D1 (the height direction D3), a pressing force shown with an arrow AR2 is applied toward the lower end of the shaft portion Ax1 from the lower end of the opening edge of the bearing portion Ax2 of the lid 3 in FIG. 9. In this case, even when the vibration is applied to the housing 1 and a force is applied to the upper side in FIG. 9 to the lid 3, the shaft portion Ax1 and the bearing portion Ax2 make contact and engage with each other in the opening/closing direction D1 in the closed state of the lid. Therefore, the lid 3 cannot move to the upper side. Moreover, even when a force is applied to the lower side in FIG. 9, the projecting portion PR1 and the opposing surface F4 are in contact with each other. Therefore, the lid 3 cannot move downward. As described above, by the projecting portion PR1 being pressed against the opposing surface F4, the relative movement of the lid 3 against the housing body 2 in the opening/closing direction D1 (the height direction D3) is suppressed. Therefore, when the vibration is applied to the housing 1, abnormal noise caused by the shaft portion Ax1 and the bearing portion Ax2 making contact and non-contact repeatedly in the opening/closing direction D1 when the vibration is applied to the housing 1, or abnormal noise caused by the lid 3 and the housing body 2 making contact and non-contact repeatedly in the opening/closing direction D1 is suppressed.

In the above-described explanation, a case in which the projecting portion PR1 is provided to the opposing surface F3 has been explained with reference to examples. However, it should be noted that, as shown in FIG. 14, the same effects are obtained also in a case that the projecting portion PR1 is provided to the opposing surface F4 and in a case that it is provided to both the opposing surface F3 and the opposing surface F4. Moreover, in the above-described explanation, a case in which the bearing portion Ax2 is provided in the lid 3 and the shaft portion Ax1 is provided in the housing body 2 has been explained with reference to examples. However, it should be noted that the same effects are obtained also in a case that a shaft portion is provided to the lid 3 and a bearing portion is provided to the housing body 2.

Figure 13:
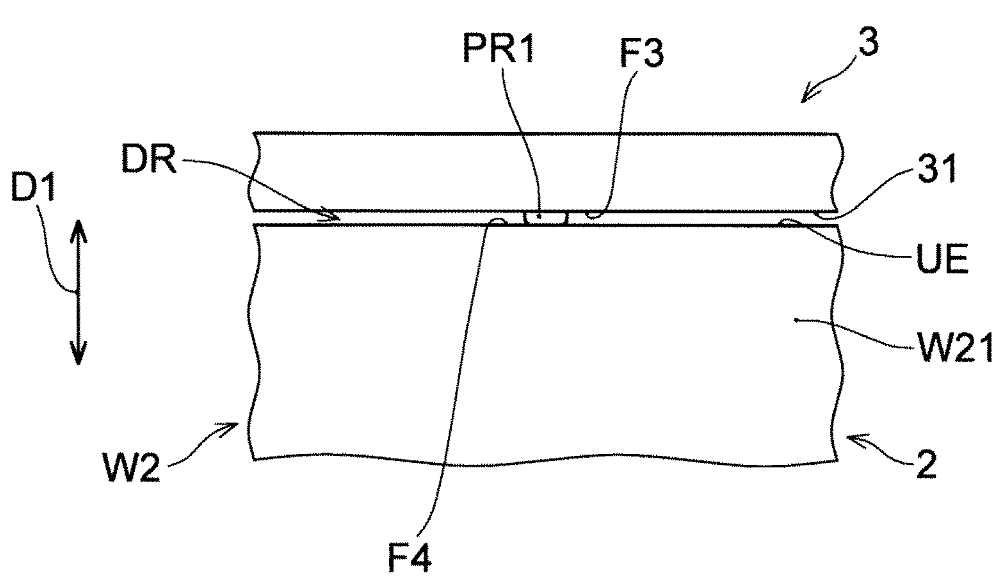
FIG. 13 is a schematic view when the housing in which housing a drainage path is formed between the lid and a side wall by a projecting portion is viewed in the width direction.

Moreover, in the present embodiment, the projecting portion PR1 is provided only to a part of the opposing surface F3 and/or the opposing surface F4 such that a drainage path DR connecting the interior of the housing 1 and the exterior of the housing 1 is formed between the upper end UE of the side wall W2 to be the aperture AP side and the back surface 31 of the lid 3 opposing the upper end UE of the side wall W2 as shown in FIG. 13 in the state in which the lid 3 closes the aperture AP and is held to the housing body 2. In this case, water entered the interior of the housing 1 can be drained from a drainage path DR formed between the lid 3, and the upper end UE of the side wall 2 as shown in FIG. 13. In the present embodiment, the drainage path DR is formed by the one second projecting portion PR2 being provided in the center region of the first side wall W21 in the axial direction X. Similarly, also in the embodiment shown in FIG. 14, a drainage path will be formed between a pair of projecting portions PR1 when the lid 3 is in the closed state. The position at which the projecting portion is provided or the number of projecting portions is not limited as long as the drainage path can be formed.

Next, the effects of the housing 1 of the present embodiment will be explained with reference to an example in which the housing 1 is applied to the cable coupling mechanism M. It should be noted that the explanations below are merely for one example, so that the present invention is not limited by the explanations below.

First, as shown in FIG. 1, the slider S is housed in the housing body 2 and the cable C is coupled to the slider S in the housing 1 in the state in which the lid 3 is opened (see FIG. 6). After the slider S and a part of the cable C is housed in the housing body 2, the lid 3 is closed as shown in FIG. 2. When the lid 3 is closed, the projecting portion PR2 is press-fitted and fitted into the axial direction gap G1 between the opposing surface F1 and the opposing surface F2 as shown in FIG. 10. Moreover, when the lid 3 is closed, the engaging portion E1 is pushed toward the engaged portion E2 of the housing body 2 while the projecting portion PR1 is pressed against the opposing surface F4 of the upper end UE of the first side wall W21 as shown in FIG. 12. In this way, the lid 3 is closed in the state in which the projecting portion PR1 is pressed against the opposing surface F4. At this time, the lid 3 is slightly bent since the engaging portion E1 and the engaged portion E2 are engaged while the tip end region R1 of the lid 3 is pushed with the projecting portion PR1 as a fulcrum.

By the projecting portion PR1 being pressed against the opposing surface F4, as shown with the arrow AR1 in FIGS. 9 and 12, a reaction force to lift the base end region R2 of the lid 3 is applied. Therefore, the bearing portion Ax2 of the lid 3 is lifted and pushed against the shaft portion Ax1 as shown with the arrow AR2. Since the lid 3 is bent with the projecting portion PR1 as a fulcrum when the engaging portion E1 provided in the tip end region R1 of the lid 3 engages the engaged portion E2, an upward force is applied (see an arrow AR3) in FIG. 12 to the tip end region R1 in the lid 3 owing to the restoring force of the lid 3. Therefore, as shown in FIG. 12, a gap in the opening/closing direction D1 between the engaging portion E1 and the engaged portion E2 (see FIG. 11) is eliminated, so that the engaging force between the engaging portion E1 and the engaged portion E2 increases.

As described above, in the present embodiment, by the projecting portion PR2 fitting into the axial direction gap G1, the relative movement of the lid 3 with respect to the housing body 2 in the axial direction X is suppressed. Moreover, by the projecting portion PR1 being pressed against the opposing surface F4, the relative movement of the lid 3 with respect to the housing body 2 in the opening/closing direction D1 is suppressed in the base end region R2 of the lid 3.

Furthermore, the relative movement of the lid 3 with respect to the housing body 2 in the opening/closing direction D1 is suppressed also in the tip end region R1 of the lid 3. Therefore, when the vibration occurs in a mounting target such as a vehicle and the like, to which the housing 1 is attached, it is suppressed that abnormal noise caused by the lid 3 and the housing body 2 making contact and non-contact repeatedly is generated.

Second Embodiment

Next, a housing 1 of a second embodiment will be explained using FIGS. 14 and 15A to 15C. The present embodiment differs from the first embodiment in that a first axial direction opposing surface F1 and a second axial direction opposing surface F2 does not have a second projecting portion PR2 in the first embodiment, and a projecting portion PR1 is provided not to a lid 3, but to a side wall W2. It should be noted that, in the explanations below, explanations on matters common to the above-described embodiment will be omitted, so that mainly the differences will be explained. It should be noted the configuration of the present embodiment and what is explained in the first embodiment can be used in combination.

Figure 15A:
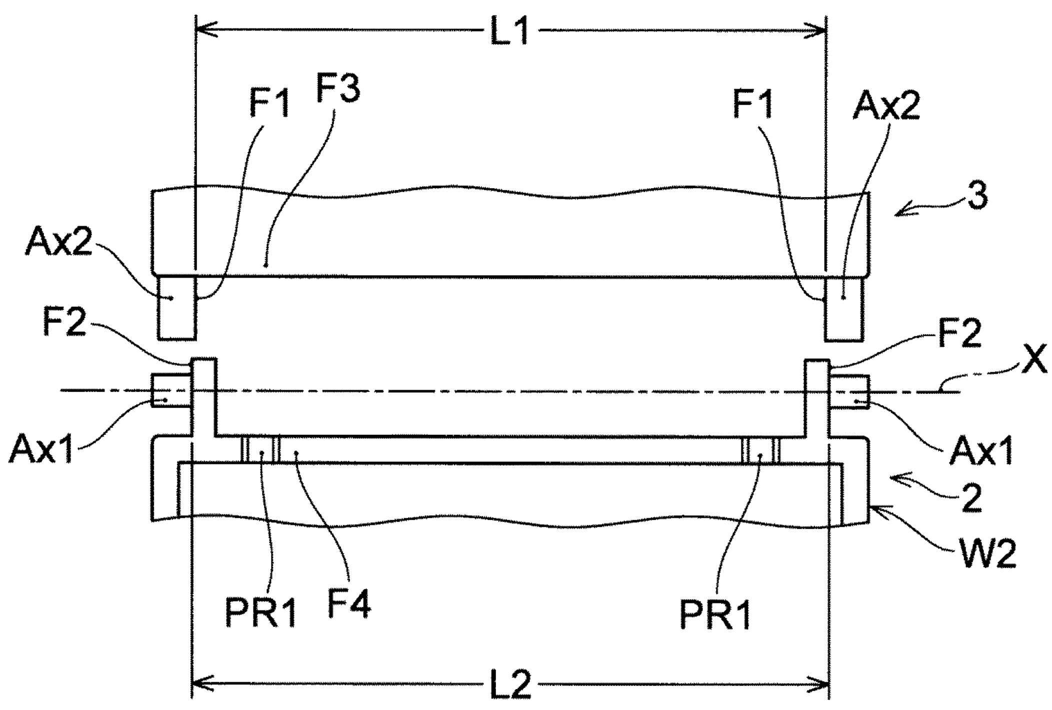
FIG. 15A is a schematic view for explaining a positional relationship between a first axial direction opposing surface and a second axial direction opposing surface of the housing of the second embodiment.
Figure 15B:
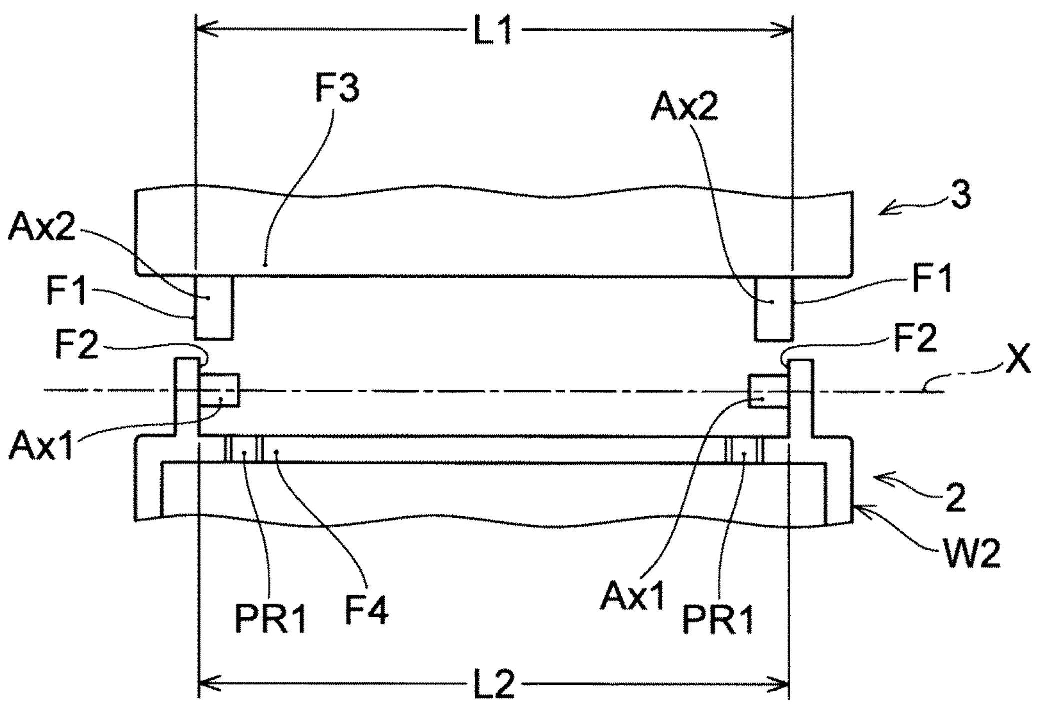
FIG. 15B is a schematic view showing a variation of the positional relationship between the first axial direction opposing surface and the second axial direction opposing surface of the housing of the second embodiment.
Figure 15C:
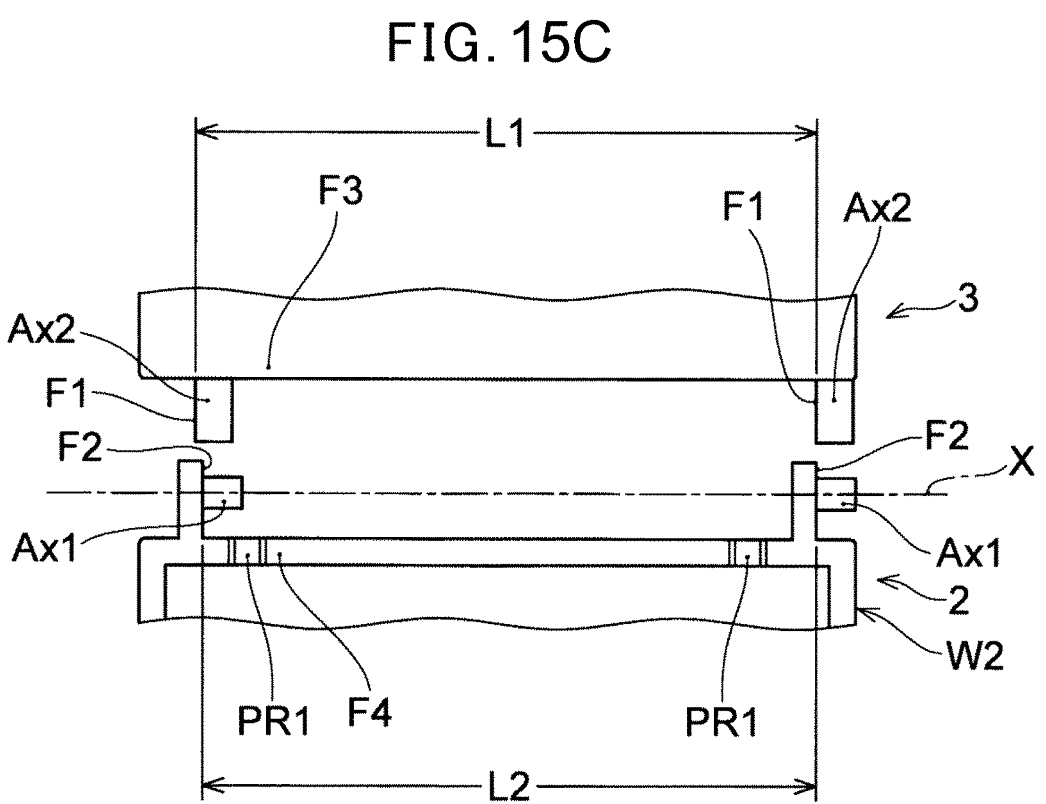
FIG. 15C is a schematic view showing another variation of the positional relationship between the first axial direction opposing surface and the second axial direction opposing surface of the housing of the second embodiment.

In the present embodiment, the opposing surface (first axial direction opposing surface) F1 and the opposing surface (second axial direction opposing surface) F2 are configured such that the surfaces are pressed against each other in the axial direction X at least in the state in which the lid 3 closes an aperture AP. More specifically, as shown in FIG. 15A, the lid 3 has a pair of first axial direction opposing surfaces F1, F1 arranged apart from each other at a distance in the axial direction X. The side wall W2 has a pair of second axial direction opposing surfaces F2, F2 arranged apart from each other at a distance in the axial direction X. A distance L1 between the pair of first axial direction opposing surfaces F1, F1 in the axial direction X and a distance L2 between the pair of second axial direction opposing surfaces F2, F2 are set such that the first axial direction opposing surface F1 and the second axial direction opposing surface F2 are pressed against each other in the axial direction X when the lid 3 is attached to the housing body 2. For example, when the pair of first axial direction opposing surfaces F1, F1 is located on the outer side (on the end side of the housing 1) with respect to the pair of second axial direction opposing surfaces F2, F2 in the axial direction X as shown in FIG. 15A, the distance L1 between the pair of first axial direction opposing surfaces F1, F1 in the axial direction is set to be less than the distance L2 between the pair of second axial direction opposing surfaces F2, F2 in the axial direction X (L1<L2). Moreover, when the pair of first axial direction opposing surfaces F1, F1 is located on the inner side (on the center side of the housing 1) with respect to the pair of second axial direction opposing surfaces F2, F2 in the axial direction X as shown in FIG. 15B, the distance L1 between the pair of first axial direction opposing surfaces F1, F1 in the axial direction is set to be greater than the distance L2 between the pair of second axial direction opposing surfaces F2, F2 in the axial direction X (L1>L2). Furthermore, when one of the pair of first axial direction opposing surfaces F1, F1 is located on the outer side (on the end side of the housing 1) with respect to one of the pair of second axial direction opposing surfaces F2, F2 in the axial direction X and the other of the pair of first axial direction opposing surfaces F1, F1 is located on the inner side (on the center side of the housing 1) in the axial direction X with respect to the other of the pair of second axial direction opposing surfaces F2, F2 as shown in FIG. 15C, the distance L1 between the pair of first axial direction opposing surfaces F1, F1 in the axial direction X is set to be greater than the distance L2 between the pair of second axial direction opposing surfaces F2, F2 in the axial direction X (L1>L2). It should be noted that the arrangement of the first axial direction opposing surface F1 and the second direction opposing surface F2 shown in FIGS. 15A to 15C is merely an example, so that the first axial direction opposing surface F1 and the second direction opposing surface F2 may have another arrangement as long as they are set to be pressed against each other in the axial direction X.

As shown in FIGS. 15A to 15C, in a case the distance L1 between the pair of first axial direction opposing surfaces F1, F1 in the axial direction X and the distance L2 between the pair of second axial direction opposing surfaces F2, F2 in the axial direction X are set so that the first axial direction opposing surface F1 and the second axial direction opposing surface F2 are pressed against each other in the axial direction X when the lid 3 is attached to the housing body 2, no axial direction gap is generated between the first axial direction opposing surface F1 and the second axial direction opposing surface F2 when the lid 3 is attached to the housing body 2. Therefore, the relative movement of the lid 3 with respect to the housing body 2 in the axial direction X is suppressed in the closed state of the lid 3. In this way, it is suppressed that abnormal noise is generated when the housing 1 vibrates.

Moreover, in the present embodiment, by having the projecting portion PR1 as shown in FIG. 14, for the same reason as the reason explained in the first embodiment, the relative movement of the lid 3 with respect to the housing body 2 in the opening/closing direction D1 (the height direction D3) is suppressed. Therefore, when the vibration is applied to the housing 1, abnormal noise caused by the shaft portion Ax1 and the bearing portion Ax2 making contact and non-contact repeatedly in the opening/closing direction D1 or abnormal noise caused by the lid 3 and the housing body 2 making contact and non-contact repeatedly in the opening/closing direction D1 is suppressed.

Furthermore, as shown in FIG. 14, the projecting portion PR1 may be provided in a proximity region of a pair of the shaft portion Ax1 and bearing portion Ax2 (for example, a region within ¼ of the length in the axial direction X of the housing 1 with respect to the position at which the shaft portion Ax1 and the bearing portion Ax2 are provided). More specifically, in FIG. 14, the pair of the shaft portion Ax1 and bearing portion Ax2 is provided in proximity to both ends of the first side wall W21 in the axial direction X, and, in a proximity region of the above-mentioned shaft portion Ax1 and bearing portion Ax2 (a proximity region on the inner side in the axial direction X), a pair of projecting portions PR1 is provided at an upper end UE of the first side wall W21. In this way, in a case that the pair of projecting portions PR1 is provided in the proximity region, in which the opening/closing direction gap G2 is generated, of the pair of the shaft portion Ax1 and bearing portion Ax2, the projecting portion PR1 is closer to the shaft portion Ax1 and bearing portion Ax2 in comparison to a case in which one projecting portion is provided at the center of the housing 1 in the axial direction X. Therefore, a rattling reduction effect can be further improved by the base end region R2 of the lid 3 being lifted in a direction away from the bottom wall W1 (the upper side in FIG. 12) with the projecting portion PR1 as a fulcrum when the lid 3 is held to the housing body 2 in the state in which the lid 3 closes the aperture AP. Moreover, in a case that the pair of projecting portions PR1 is provided in the proximity region, in which the opening/closing direction gap G2 is generated, of the pair of the shaft portion Ax1 and bearing portion Ax2, it becomes easier to open the lid 3 owing to a reaction force applied to the lid 3 from the pair of projecting portions PR1 when engagement between the engaging portion E1 and the engaged portion E2 is released to open the lid 3.

REFERENCE SIGNS LIST

1 HOUSING
2 HOUSING BODY
3 LID
31 BACK SURFACE OF LID
32 FRONT SURFACE OF LID
AP APERTURE
AT OUTER CASING ATTACHING PORTION
Ax1 SHAFT PORTION
Ax2 BEARING PORTION
C, C1, C21, C22 CABLE
D1 OPENING/CLOSING DIRECTION

D2 WIDTH DIRECTION OF HOUSING
D3 HEIGHT DIRECTION OF HOUSING
DR DRAINAGE PATH
E1 ENGAGING PORTION
E2 ENGAGED PORTION
F1 OPPOSING SURFACE (FIRST AXIAL DIRECTION OPPOSING SURFACE)
F2 OPPOSING SURFACE (SECOND AXIAL DIRECTION OPPOSING SURFACE)
F3 OPPOSING SURFACE (FIRST OPENING/CLOSING DIRECTION OPPOSING SURFACE)
F4 OPPOSING SURFACE (SECOND OPENING/CLOSING DIRECTION OPPOSING SURFACE)
FX FIXING PORTION
G1 AXIAL DIRECTION GAP
G2 OPENING/CLOSING DIRECTION GAP
H HOOD
L1 DISTANCE IN AXIAL DIRECTION BETWEEN A PAIR OF FIRST AXIAL DIRECTION OPPOSING SURFACES
L2 DISTANCE IN AXIAL DIRECTION BETWEEN A PAIR OF SECOND AXIAL DIRECTION OPPOSING SURFACES
M CABLE COUPLING MECHANISM
OC OUTER CASING
OP1 OPERATING PORTION
OP21, OP22 OPERATED PORTION
P SEPARATION PREVENTING PORTION
PR1 PROJECTING PORTION
PR2 SECOND PROJECTING PORTION
R1 TIP END REGION
R2 BASE END REGION
S SLIDER
UE UPPER END OF SIDE WALL
V VEHICLE
W1 BOTTOM WALL
W2 SIDE WALL
W21 FIRST SIDE WALL
W211 PROJECTING PIECE
W22 SECOND SIDE WALL
W23 THIRD SIDE WALL
W24 FOURTH SIDE WALL
X ROTATIONAL AXIS
θ ANGLE FORMED BY UPPER END OF SIDE WALL AND BACK SURFACE OF LID

The invention claimed is:

1. A housing comprising:

a housing body comprising a bottom wall, and a side wall erected from the bottom wall, wherein the housing body has an aperture opened to oppose the bottom wall; and a lid for closing the aperture, wherein the lid is connected to the side wall to rotate around a predetermined rotational axis, wherein one of the housing body and the lid has a shaft portion and the other one of the housing body and the lid has a bearing portion to support the shaft portion such that the lid rotates around the rotational axis, wherein the side wall has, in a base end region to be a rotational axis side, a second opening/closing direction opposing surface opposed in an opening/closing direction of the lid to a first opening/closing direction opposing surface provided to the lid in a state in which the lid closes the aperture, wherein the first opening/closing direction opposing surface and/or the second opening/closing direction opposing surface has a projecting portion projecting in the opening/closing direction from the first opening/closing direction opposing surface and/or the second opening/closing direction opposing surface, wherein an amount of projection of the projecting portion in the opening/closing direction is greater than a size of an opening/closing direction gap generated in the opening/closing direction between the shaft portion and the bearing portion, and the shaft portion is configured to be pressed against the bearing portion in the opening/closing direction by the projecting portion being pressed against the first opening/closing direction opposing surface and/or the second opening/closing direction opposing surface in the opening/closing direction in a state in which the lid closes the aperture and is held to the housing body, wherein the side wall has a second axial direction opposing surface opposed in an axial direction of the rotational axis to a first axial direction opposing surface provided to the lid in a state in which the lid closes the aperture of the housing body, wherein the first axial direction opposing surface and the second axial direction opposing surface are configured to be pressed against each other in the axial direction at least in the state in which the lid closes the aperture, and wherein the projecting portion is provided only to a part of the first opening/closing direction opposing surface and/or the second opening/closing direction opposing surface such that a drainage path connecting an interior of the housing and an exterior of the housing is formed between an upper end of the side wall to be the aperture side and a back surface of the lid opposing the upper end of the side wall in the state in which the lid closes the aperture and is held to the housing body.

2. The housing according to claim 1, wherein the housing body and/or the lid has, in a tip end region to be a side far from the rotational axis, an engaging portion to hold the housing body and the lid in the state in which the lid closes the aperture, and, wherein, when the lid is held to the housing body by the engaging portion in the state in which the lid closes the aperture, the base end region of the lid is lifted in a direction away from the bottom wall with the projecting portion as a fulcrum, and the shaft portion is pressed against the bearing portion.

3. The housing according to claim 1, wherein the first axial direction opposing surface and/or the second axial direction opposing surface has a second projecting portion projecting in the axial direction from the first axial direction opposing surface and/or the second axial direction opposing surface, and an amount of projection of the second projecting portion in the axial direction is greater than a size of an axial direction gap generated in the axial direction between the first axial direction opposing surface and the second axial direction opposing surface, and the second projecting portion is configured to fit into the axial direction gap in the state in which the lid closes the aperture.

4. The housing according to claim 1, wherein the lid has a pair of first axial direction opposing surfaces arranged apart from each other at a distance in the axial direction, wherein the side wall has a pair of second axial direction opposing surfaces arranged apart from each other at a distance in the axial direction, and wherein a distance in the axial direction between the pair of first axial direction opposing surfaces and a distance in the axial direction between the pair of second axial direction opposing surfaces are set such that the first axial direction opposing surface and the second axial direction opposing surface are pressed against each other in the axial direction when the lid is attached to the housing body.

5. The housing according to claim 3, wherein the second projecting portion is provided to the first axial direction opposing surface provided to the lid, and the second projecting portion is configured not to fit into the axial direction gap in a state in which the lid is opened at a predetermined angle with respect to the housing body from a closed state in which the lid closes the aperture, and is configured to fit into the axial direction gap in a closure proximity region to be in proximity to the closed state in which the lid closes the aperture.

6. The housing according to claim 1, wherein the housing is configured such that a cable to be routed to a vehicle is connected to the housing.

7. A housing comprising:

a housing body comprising a bottom wall, and a side wall erected from the bottom wall, wherein the housing body has an aperture opened to oppose the bottom wall; and a lid for closing the aperture, wherein the lid is connected to the side wall to rotate around a predetermined rotational axis, wherein one of the housing body and the lid has a shaft portion and the other one of the housing body and the lid has a bearing portion to support the shaft portion such that the lid rotates around the rotational axis, wherein the side wall has, in a base end region to be the rotational axis side, a second opening/closing direction opposing surface opposed in an opening/closing direction of the lid to a first opening/closing direction opposing surface provided to the lid in a state in which the lid closes the aperture, wherein the first opening/closing direction opposing surface and/or the second opening/closing direction opposing surface has a projecting portion projecting in the opening/closing direction from the first opening/closing direction opposing surface and/or the second opening/closing direction opposing surface, wherein an amount of projection of the projecting portion in the opening/closing direction is greater than a size of an opening/closing direction gap generated in the opening/closing direction between the shaft portion and the bearing portion, and the shaft portion is configured to be pressed against the bearing portion in the opening/closing direction by the projecting portion being pressed against the first opening/closing direction opposing surface and/or the second opening/closing direction opposing surface in the opening/closing direction in a state in which the lid closes the aperture and is held to the housing body, wherein the side wall has a second axial direction opposing surface opposed in an axial direction of the rotational axis to a first axial direction opposing surface provided to the lid in a state in which the lid closes the aperture of the housing body, and wherein the projecting portion is provided only to a part of the first opening/closing direction opposing surface and/or the second opening/closing direction opposing surface such that a drainage path connecting an interior of the housing and an exterior of the housing is formed between an upper end of the side wall to be the aperture side and a back surface of the lid opposing the upper end of the side wall in the state in which the lid closes the aperture and is held to the housing body.

* * * * *